United States Patent

Arakawa et al.

Patent Number: 5,822,450
Date of Patent: Oct. 13, 1998

[54] METHOD FOR MONITORING EQUIPMENT STATE BY DISTRIBUTION MEASUREMENT DATA, AND EQUIPMENT MONITORING APPARATUS

[75] Inventors: Akio Arakawa, Kawasaki; Hideyuki Tsurumaki, Yokohama; Yoshiaki Hattori, Zama; Shigeru Kanemoto, Yokohama; Ichiro Tai, Tokyo-To; Riyoko Haneda, Yokohama, all of Japan

[73] Assignee: Kabushiki Kaisha Toshiba, Kawasaki, Japan

[21] Appl. No.: 519,894

[22] Filed: Aug. 28, 1995

[30] Foreign Application Priority Data

Aug. 31, 1994 [JP] Japan .................................. 6-206945
Mar. 28, 1995 [JP] Japan .................................. 7-069432

[51] Int. Cl.$^6$ ..................................................... G06K 9/00
[52] U.S. Cl. ........................................... 382/152; 382/285
[58] Field of Search ................................... 382/149, 154, 382/141, 144, 152, 285, 294; 364/551.02

[56] References Cited

U.S. PATENT DOCUMENTS

| | | | |
|---|---|---|---|
| 4,731,860 | 3/1988 | Wahl ........................................ | 382/141 |
| 4,918,627 | 4/1990 | Garcia et al. ............................ | 382/152 |
| 5,243,665 | 9/1993 | Maney et al. ............................ | 382/152 |
| 5,321,766 | 6/1994 | Fraas et al. .............................. | 382/152 |
| 5,345,514 | 9/1994 | Mahdavieh et al. .................... | 382/152 |
| 5,610,994 | 3/1997 | Stadfeld et al. ........................ | 382/152 |
| 5,671,343 | 9/1997 | Kondo et al. ........................... | 382/154 |

FOREIGN PATENT DOCUMENTS 4-291606  10/1992  Japan .

*Primary Examiner*—Joseph Mancuso
*Attorney, Agent, or Firm*—Foley & Lardner

[57] ABSTRACT

A method for monitoring equipment state by distribution measurement data comprises: the steps of momentarily taking in two-dimensional distribution measurement data relating to the state of equipments including an equipment to be monitored; allowing the two-dimensional distribution measurement data and a display result by a three-dimensional shape model of the equipment to be monitored to undergo positioning and carrying out overlaid display in such a manner that they are caused to correspond to each other; designating an equipment portion to be inspected from the display content; allowing measurement data of the equipment to be monitored to undergo mapping onto the three-dimensional shape model corresponding to the designated equipment portion; and detecting changes in the measurement data to judge presence or absence of unusual condition of the equipment. Moreover, an equipment state monitoring apparatus comprises: a distribution measurement unit for measuring distribution of temperature, vibration or sound, etc. at the plant equipment surface; a distribution measurement image data positioning unit for determining position and direction of the distribution measurement unit in order to allow distribution measurement image data from the distribution measurement unit to undergo positioning so that it is in correspondence with a projection chart of a corresponding plant equipment spatial shape model; a texture-mapping unit for allowing the distribution measurement image data to undergo texture-mapping onto the surface of the spatial shape model of the plant equipment on the basis of the position and the direction of the measurement unit determined by the distribution measurement image data positioning unit; a projecting unit for describing a projection chart of the texture-mapped plant equipment spatial shape model; and an image display unit for displaying the projection chart from the projecting unit.

28 Claims, 38 Drawing Sheets

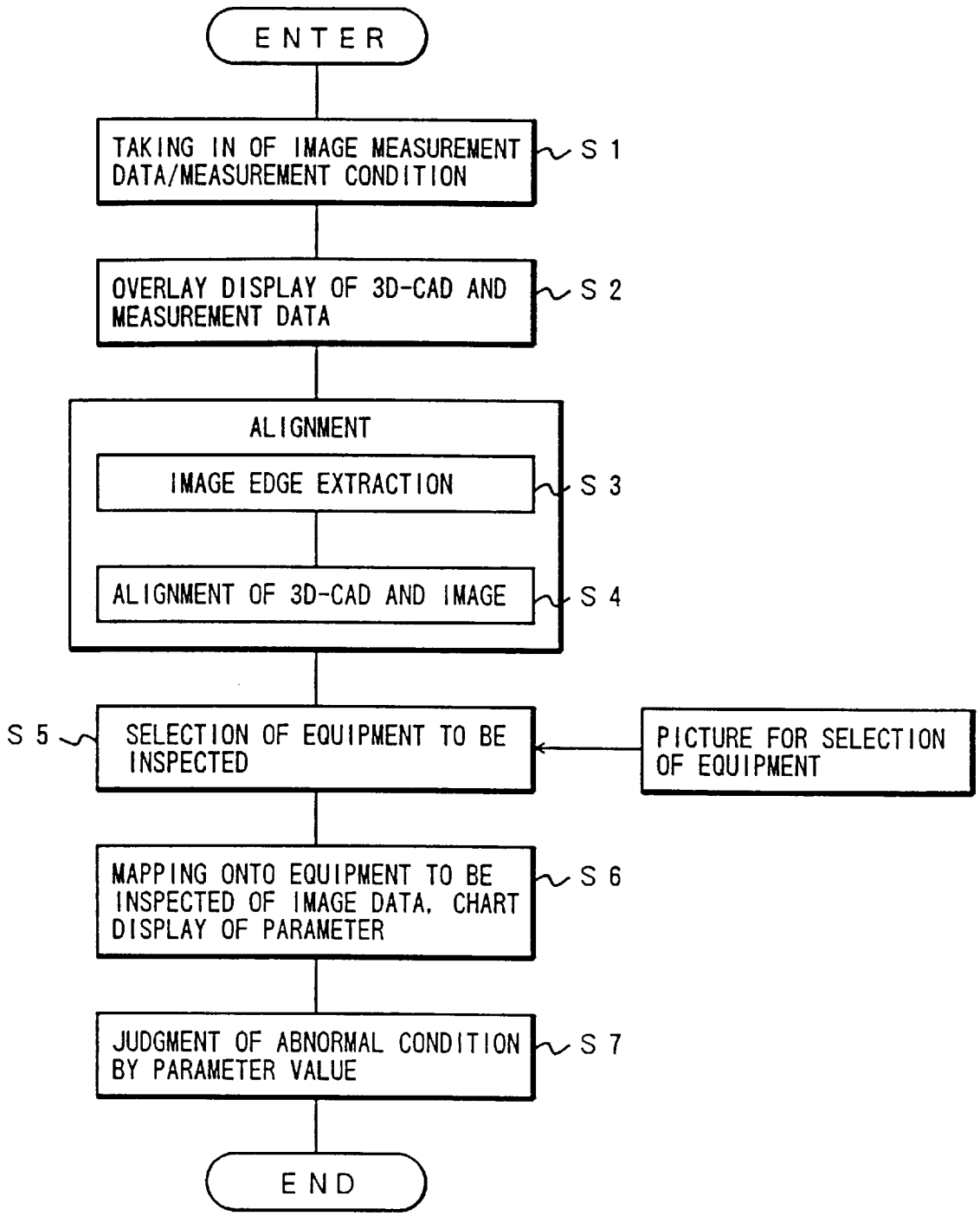
F I G. 1

|  | i−1 | i | i+1 |
|---|---|---|---|
| j−1 | xwt−ywt | −ywt | −xwt−ywt |
| j | xwt | 0 | −xwt |
| j+1 | xwt+ywt | +ywt | −xwt+ywt | xwt = cos(90−angle), ywt = sin(90−angle)

(a) OPERATOR OF GRADIENT

X kernel:

|  | i−1 | i | i+1 |
|---|---|---|---|
| j−1 | −1 | 0 | 1 |
| j | −2 | 0 | 2 |
| j+1 | −1 | 0 | 1 |

Y kernel:

|  | i−1 | i | i+1 |
|---|---|---|---|
| j−1 | −1 | −2 | −1 |
| j | 0 | 0 | 0 |
| j+1 | 1 | 2 | 1 |

(b) Sobel OPERATOR

FIG. 5

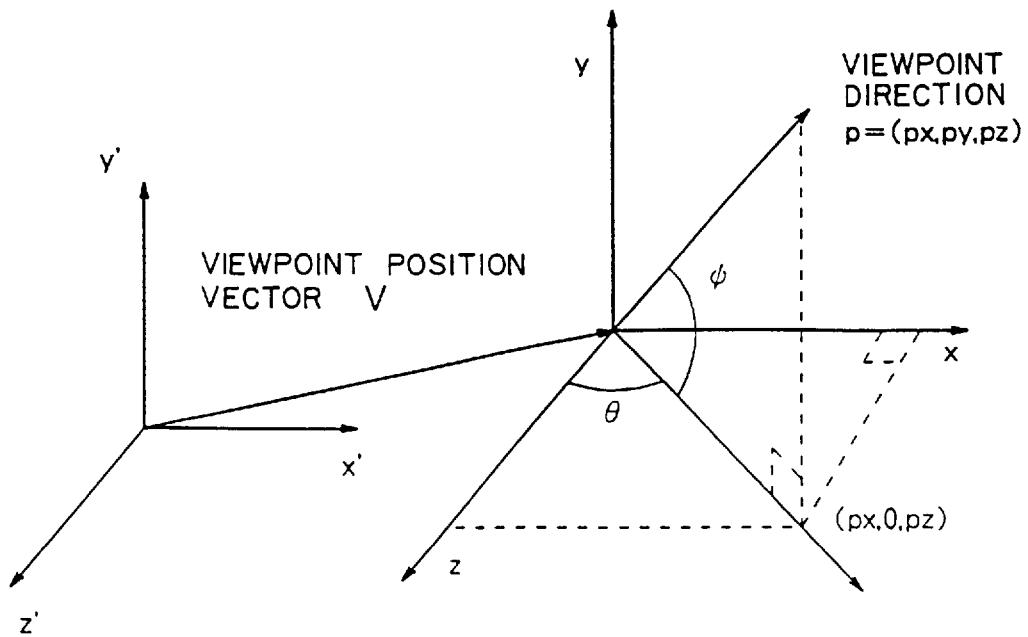
F I G. 6 (a)
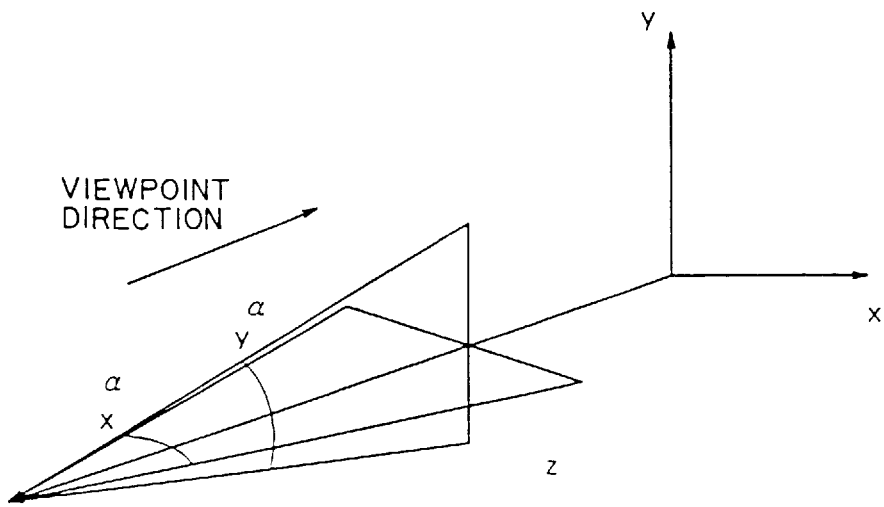
F I G. 6 (b)

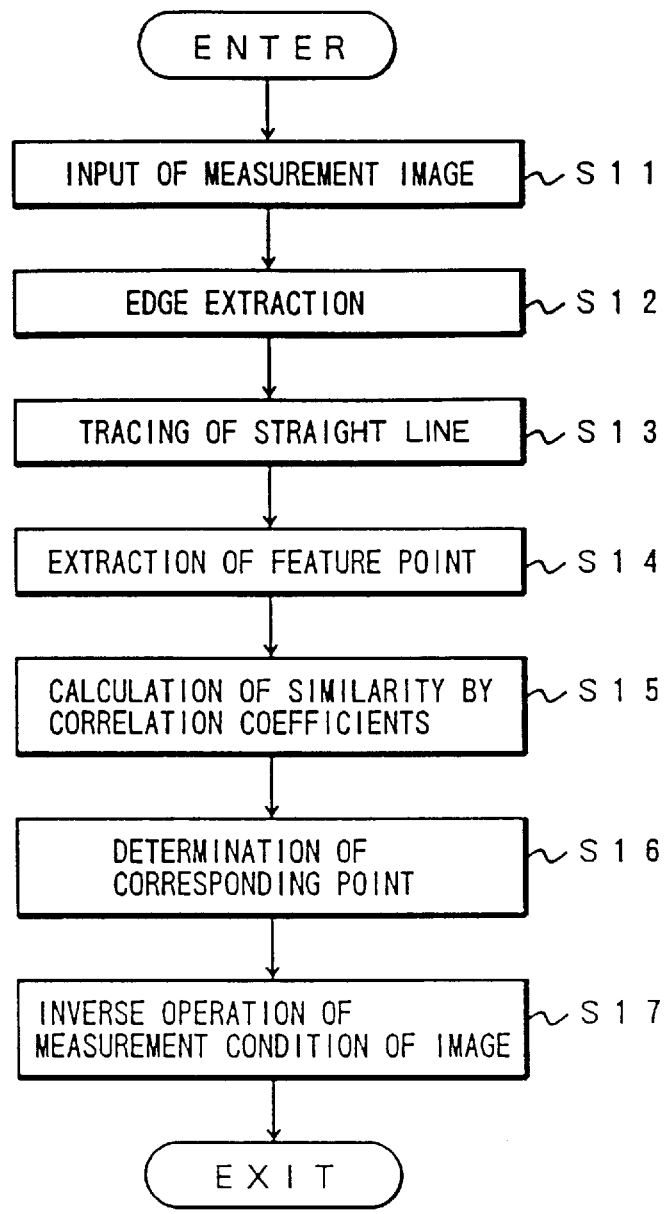
F I G. 8

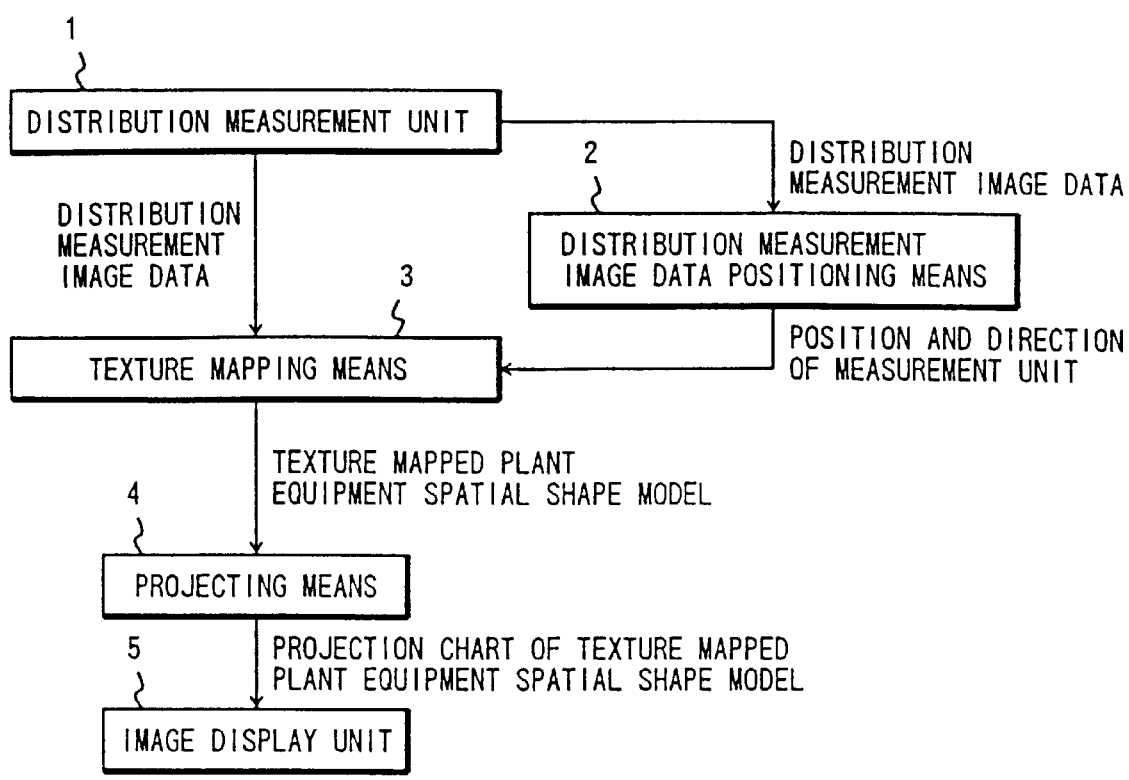
F I G. 1 9

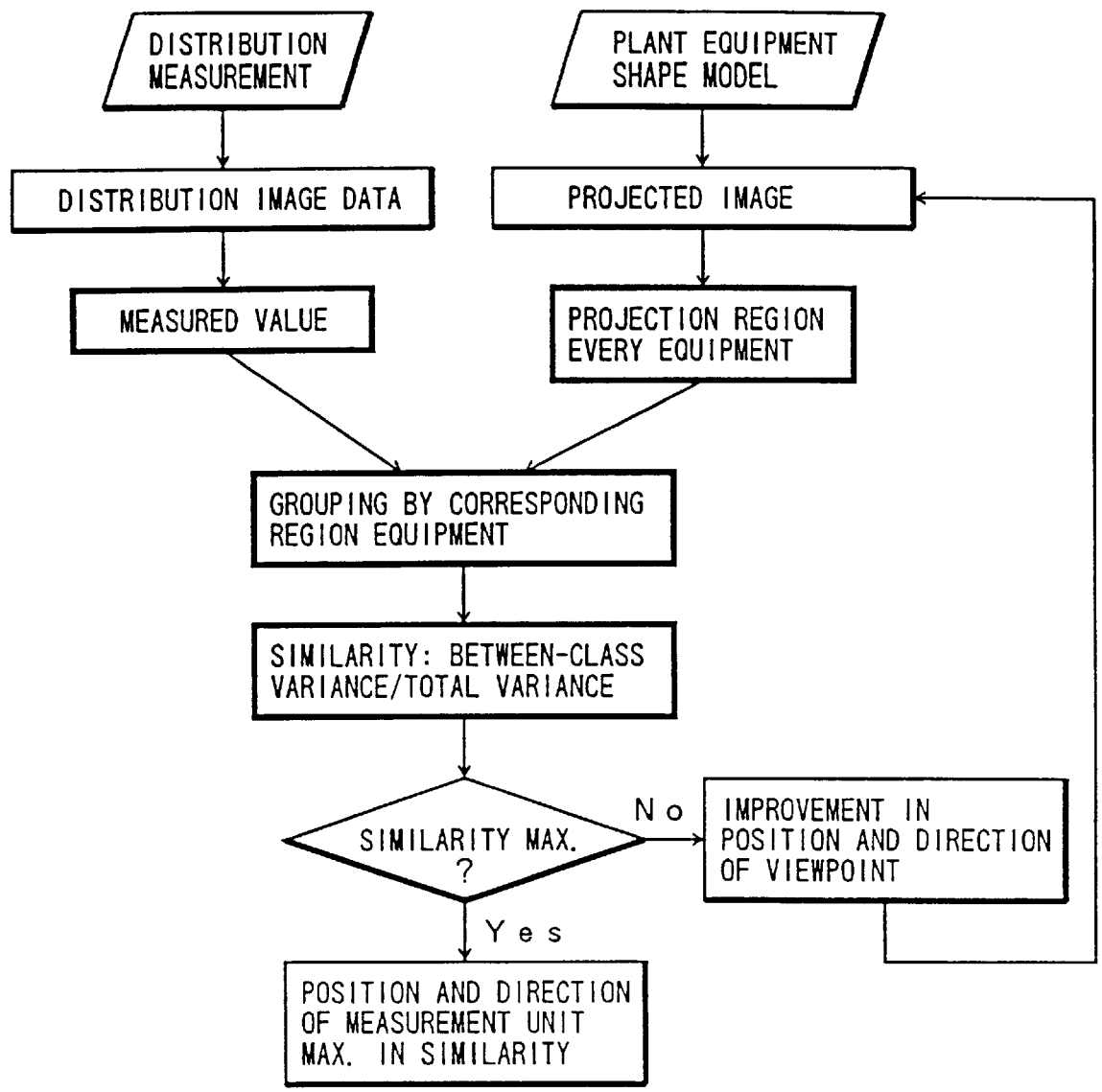
F I G. 2 1

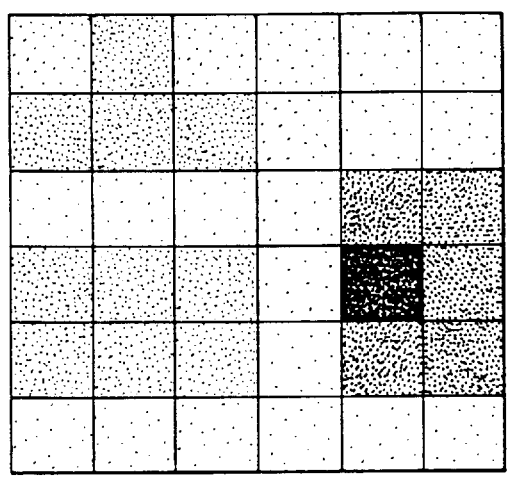
F I G . 24

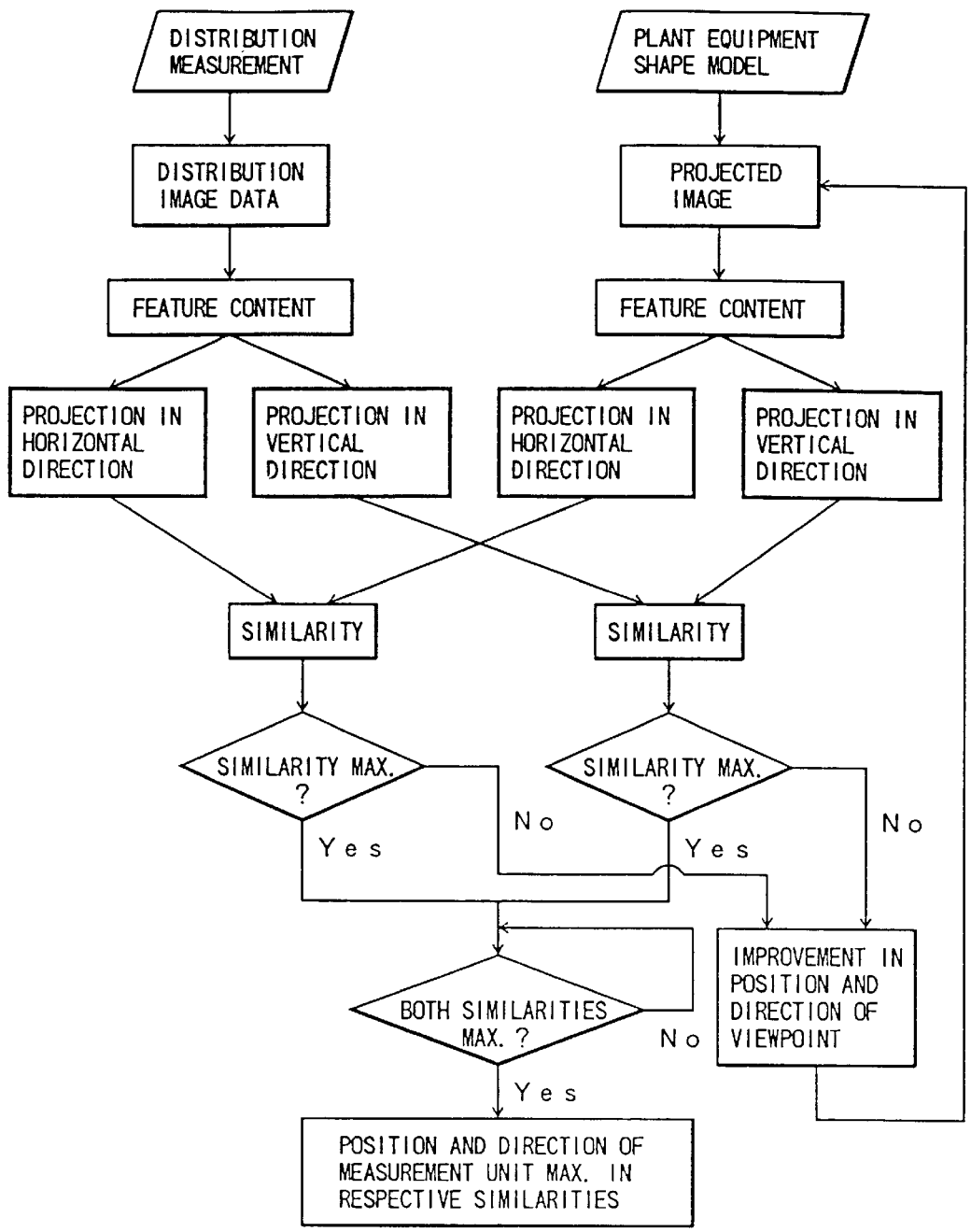
F I G. 3 1

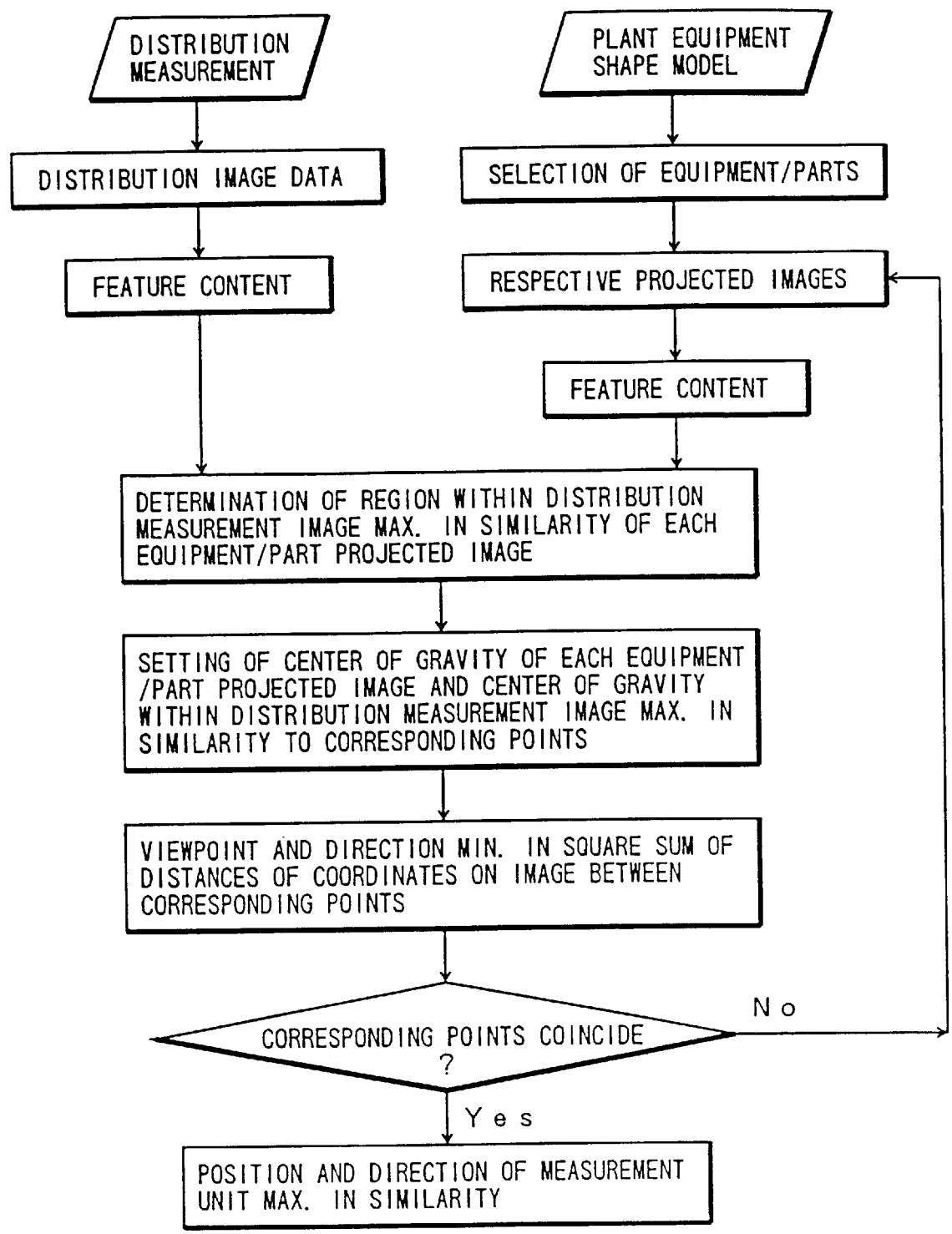
F I G. 3 3

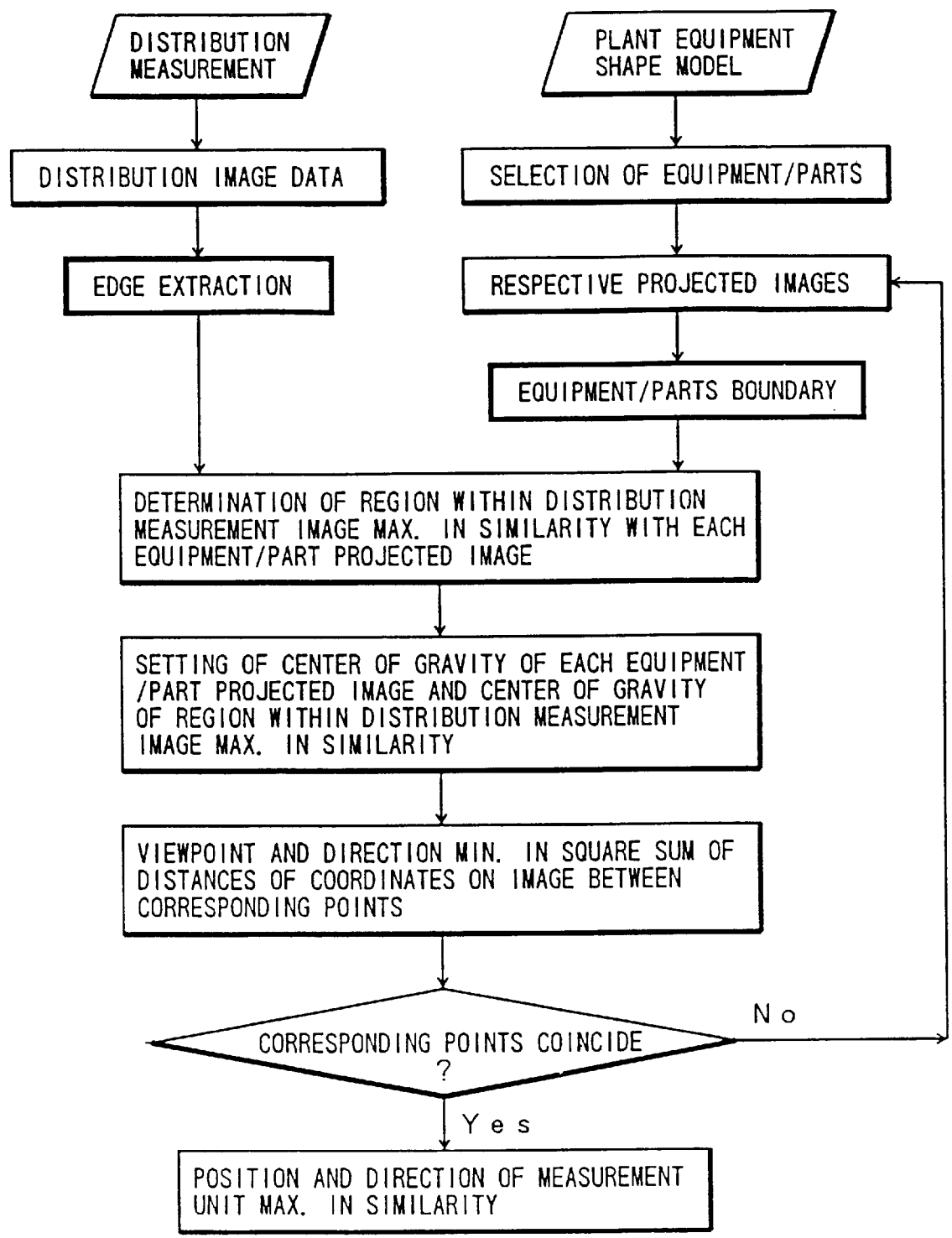
F I G. 3 4

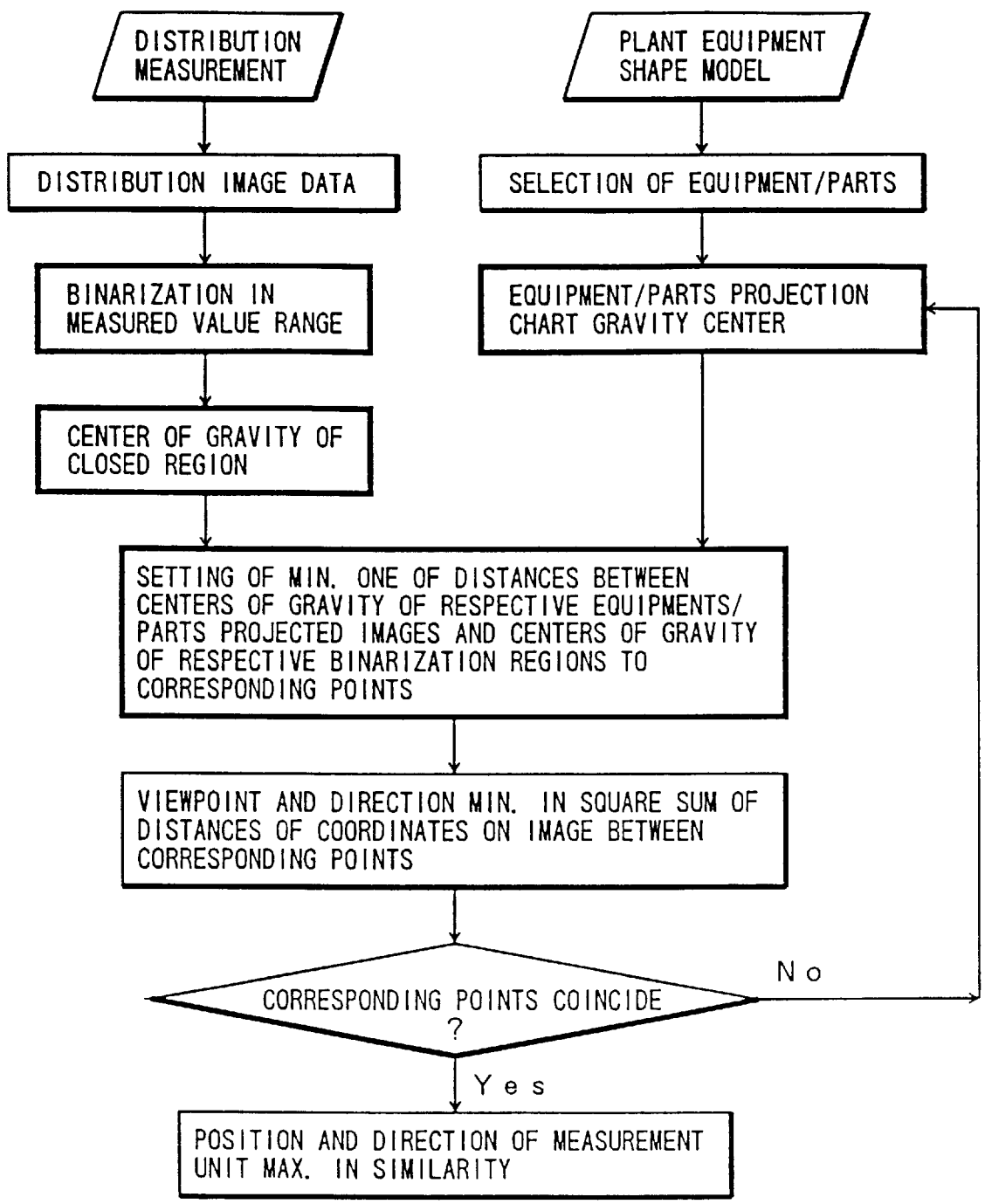
F I G. 3 9

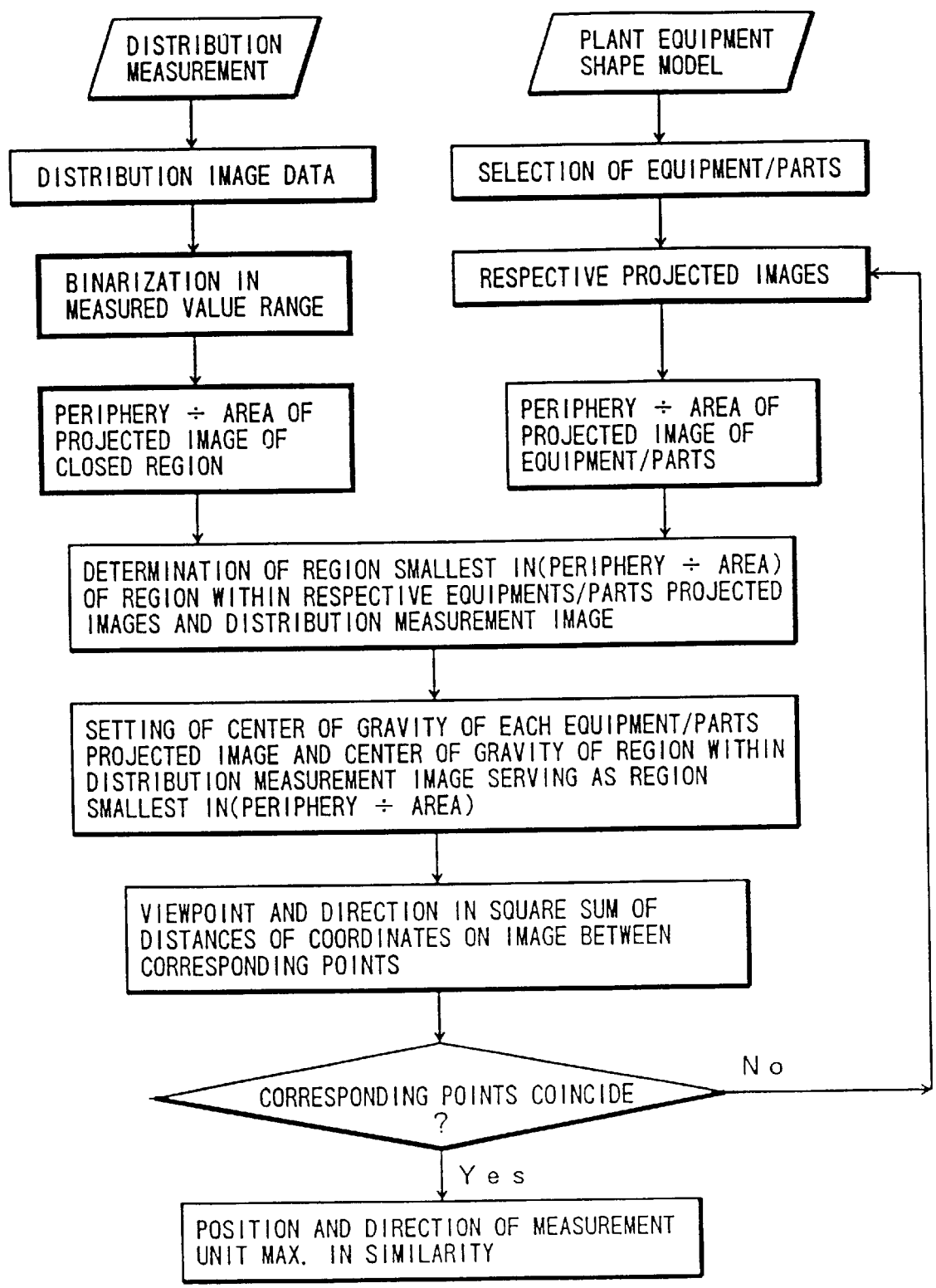
F I G. 4 3

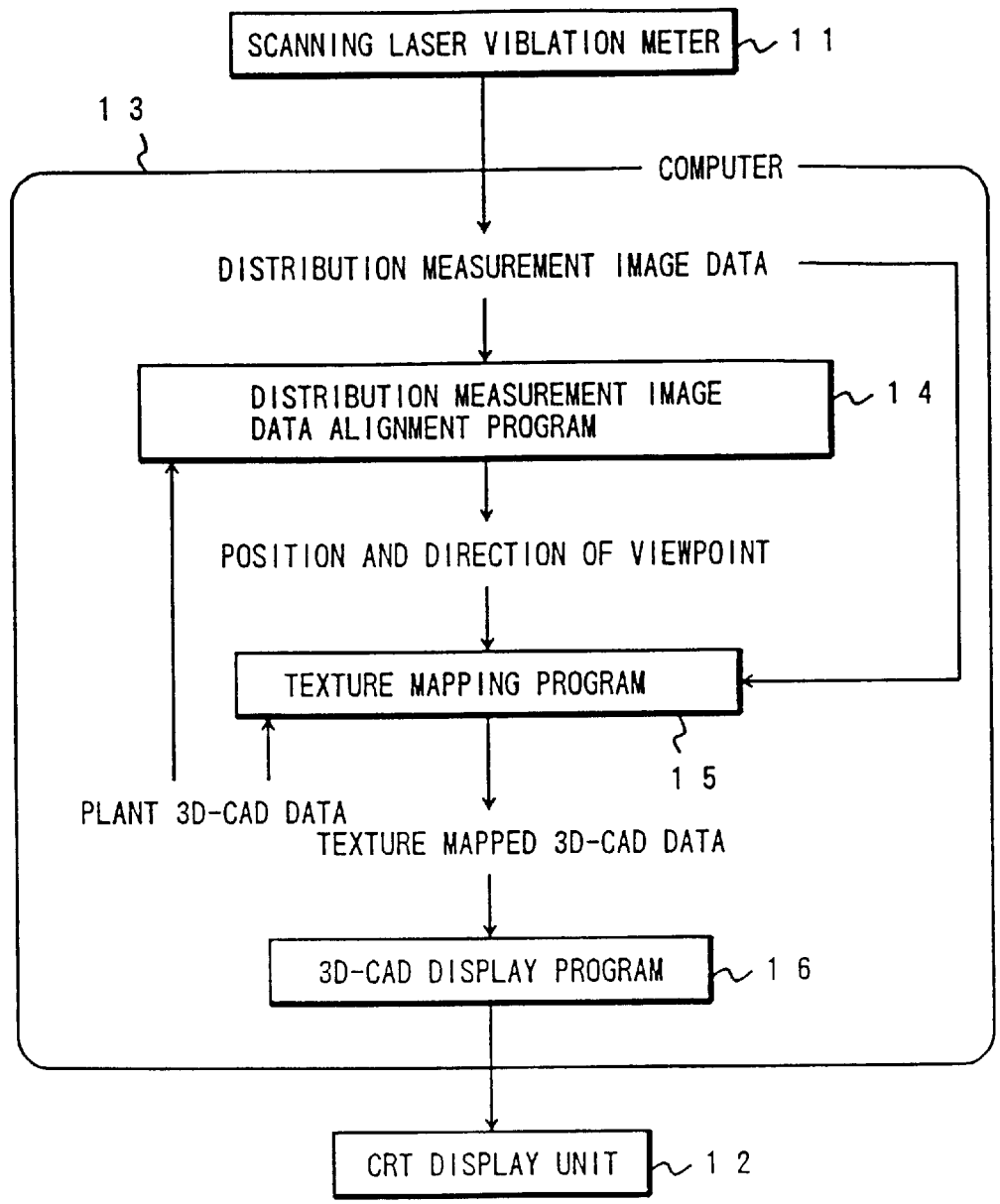
F I G. 4 5

METHOD FOR MONITORING EQUIPMENT STATE BY DISTRIBUTION MEASUREMENT DATA, AND EQUIPMENT MONITORING APPARATUS

BACKGROUND OF THE INVENTION

The present invention relates to a method and an apparatus for monitoring the state of equipments and judging unusual condition thereof in so called plant, and more particularly to a method and an apparatus for monitoring equipment state by using distribution measurement data from spatially distributed equipments.

In the state monitoring for plant equipments, in the case of monitoring distributions of surface temperature and vibrations of an equipment by means of infrared (ray) cameras and laser vibration meters, since two-dimensional data distribution can be obtained as compared to conventional measurement at predetermined points, it becomes possible to more finely grasp the state of the equipment. Namely, if magnitudes of data of respective points of sampled (picked up) data are displayed in a form such as contour line in correspondence with changes in color or luminance proportional thereto, it is possible to carry out monitoring/diagnosis of the state of an equipment to be monitored by visually recognizing a pattern of such changes of color or luminance.

However, in such two-dimensional measurements, since measurement data are obtained in the two-dimensional area, there are instances where not only data relating to an equipment to be measured but also data at the peripheral thereof may be measured. For this reason, a processing for extracting data of the equipment to be measured from an image of the distribution of sampled data becomes necessary.

Moreover, since the equipment to be measured is a three-dimensional object (body), it is impossible to clearly recognize or grasp to which portion of the equipment sampled data corresponds, which portion of the three-dimensional object is being measured at present, or which portion should be further measured in future. For this reason, if an approach can be adopted such that shape data of an object which is primarily three-dimensional is used so that measurement data is permitted to correspond thereto, it becomes possible to more effectively grasp the equipment state in the monitoring of equipment.

Hitherto, in the case where data sampled by remote sensors are used to monitor the equipment state, since the technology for extracting necessary data from the two-dimensional data, the technology for recognition of the two-dimensional pattern, and the technology for allowing two-dimensional data to correspond to the three-dimensional shape of an equipment to be monitored have not been established, an approach was employed to cope with such an equipment state monitoring by interpretation by human labor. Namely, such an approach was adopted to synthesize information obtained from sensors into a two-dimensional image (pictorial image) to present the image thus obtained to an observer to allow the observer to discriminate necessary data from the image thus presented to observe the distribution state of parameters therein to thereby monitor the state of the equipment to be monitored to cope with such situations.

However, in the case where the state of equipment is monitored on-line at all times, it is considered that it is not realistic that human labor intervenes in the process from measurement of data by sensors up to estimation/judgment of the equipment state based on those data.

Meanwhile, in the case where installation position and direction of measurement of a measurement equipment to be measured are unknown, a processing for determining the installation position and the direction of measurement of the measurement equipment is required for the purpose of carrying out positioning (alignment) of a distribution measurement image and a two-dimensional projection chart (drawing) of a three-dimensional shape model so that they are in correspondence with each other. In the case where such distribution measurement image is a projected image of visible light reflected from the equipment surface, a method is employed to specify a plurality of corresponding points of the spatial shape model data of the plant equipment from feature points of a boundary of the surface of the equipment, or a method is employed to maximize correlation between a projected image by visible light and a quantity of reflected light calculated from the spatial shape model data of the plant equipment, thereby making it possible to determine position and direction of the viewpoint. However, in the case of a distribution measurement image which is not a reflection image of visible light from the equipment surface, it is difficult to determine installation position and direction of measurement of the measurement equipment by using such methods.

As described above, in the case where distribution measurement image data of temperatures, vibrations or sounds obtained by a remote non-contact measurement equipment or equipments in which installation position and measuring direction are unknown are used to carry out monitoring of the equipment state, a processing for determining installation position and direction of measurement of the measurement equipment is required as described above in order to allow the spatial shape model data of the plant equipment to correspond to the distribution measurement image data. However, there is the problem that the conventional method for determining position and direction of the viewpoint a projected image of visible light cannot be utilized for this processing as it is.

SUMMARY OF THE INVENTION

This invention has been made in consideration of drawbacks as described above, and its object is to provide a monitoring method for equipment state which can simply and precisely carry out monitoring/diagnosis of the equipment state by two-dimensional distribution measurement data take out from an equipment to be monitored.

In more practical sense, in the case where vibration, temperature or acoustic data of plant equipment are obtained, by using a remote non-contact measurement equipment installed at a certain point, as two-dimensional distribution measurement image data observed from the point, this invention has been made in order to contemplate establishing a method of determining the viewpoint position and the measurement direction, i.e., spatial coordinates of the measurement equipment and angles in horizontal and vertical directions where the measurement equipment is directed at the time of measurement, particularly a method of calculating quantity serving as criterion of correspondence between distribution measurement image and projection chart of the spatial shape model data of the plant equipment in order to determine viewpoint position and measurement direction, and thus has an object to provide a method and an apparatus for facilitating positioning of the distribution measurement image and the spatial shape model data of the plant equipment, which is carried out so that they are in correspondence with each other, thus to carry out grasp/monitoring of the equipment state.

To achieve the above-described objects, in accordance with this invention, there is provided a method for monitoring equipment state by distribution measurement data comprising the steps of: taking in two-dimensional distribution measurement data relating to the state of equipments including an equipment to be monitored; allowing the two-dimensional distribution measurement data and a display result by a three-dimensional shape model of the equipment to be monitored to undergo positioning, and overlay-displaying them in such a manner that they are caused to correspond to each other; designating an equipment portion to be inspected from the display content; allowing measurement data of the equipment to be monitored to undergo mapping onto the three-dimensional shape model corresponding to the designated equipment portion; and detecting changes in the measurement data to judge whether or not the equipment to be monitored is in unusual condition.

Namely, distribution measurement data relating to two-dimensional parameters and a display result of an equipment to be inspected by a three-dimensional shape model like three-dimensional CAD image are overlaid (superposed) by allowing feature points of the images to be in correspondence with each other to allow the equipment to be inspected and its measurement data to correspond to each other to automatically extract only data necessary for monitoring equipment state to estimate the state. Then, the extracted two-dimensional distribution measurement data is caused to undergo mapping onto the three-dimensional shape model to carry out three-dimensional display and graphic display of the two-dimensional space to thereby more intelligibly display those information to compare them with the absolute value level or past measurement data to thereby carry out monitoring and judgment of unusual condition of the equipment state. It should be noted that, in the specification of this invention, the equipment includes portion including parts.

In accordance with the above-mentioned configuration, two-dimensional parameter distribution is measured with respect to an equipment to be inspected. Thus, the two-dimensional parameter distribution image and the shape of the equipment to be inspected by the three-dimensional shape model are simultaneously displayed. Then, these two display results are aligned by carrying out positioning so that they are overlaid (superposed). Thus, corresponding measurement data is caused to undergo mapping onto the three-dimensional shape model. The mapped measurement data thus obtained, or the graphically displayed spatial distribution is caused to undergo judgment by comparison with past data to monitor the state of the equipment to judge unusual condition.

In order to achieve the above-mentioned objects, in accordance with this invention, there is provided a method for monitoring equipment state by distribution measurement data in which two-dimensional distribution measurement image data obtained by measuring, by using a remote non-contact measurement equipment or equipments, from a certain point, state quantity of the equipment installed at a plant is caused to undergo positioning so that it is in correspondence with the equipment or the parts surface of spatial shape model of the plant equipment to display it in an overlaid (superposed) manner, the method comprising the steps: of adjusting position and direction (angle) of the viewpoint with respect to a projected plant equipment spatial shape model on the basis of feature content of the distribution measurement image data and feature content of a projected image obtained by projecting the plant equipment spatial shape model on the plane to determine a projected image of the plant equipment spatial shape model where similarity with the distribution measurement image data is maximum, allowing the position and the direction (angle) of the viewpoint of the projected image to be a position and a direction of the measurement equipment to allow the distribution measurement image data to undergo positioning so that it is in correspondence with the equipment or parts surface of the plant equipment spatial shape model.

In the monitoring method for equipment state of this invention, feature contents are determined from distribution measurement image data obtained by measurement. On the other hand, an image projected onto the plane is determined by calculation by approximate viewpoint position and viewing angle thereof from the plant equipment shape model to determine feature contents from that image. Then, similarity between determined feature contents of the both images is determined to repeat an operation to adjust the approximate viewpoint position and its viewing angle of the plant equipment shape model projected image so as to increase the above-mentioned similarity to determine a projected image where similarity is maximum. Thus, it is possible to carry out positioning of the distribution measurement image data obtained by the measurement equipment, with the viewpoint position and its viewing angle of the projected image being as position and direction of the measurement equipment, such that it is in correspondence with the plant equipment shape model.

In the case where image data obtained by edge-extracting distribution measurement image data is used as feature content of the distribution measurement image data, and displayed image data obtained by projecting, on the plane, boundary line, i.e., wire frame of the equipment or parts surface of the shape model is used as feature content of the plant equipment spatial shape model, e.g., image data obtained by edge-extracting distribution measurement image data by Sobel operator is generated as feature content of the distribution measurement image data. On the other hand, an image data is generated such that pixels of distribution measurement image data including the wire frame when the plant equipment spatial model projected image is overlaid (superposed) on the distribution measurement image data are caused to be 1 and pixels except for the above are caused to be 0 to determine moment correlation between both image data, thereby making it possible to determine a projected image of a viewpoint position and its viewing angle in correspondence with the position and the direction of the measurement equipment with the moment correlation being as similarity.

Moreover, an approach may be employed such that measured values are used as feature content of the distribution measurement image data and projection area of the equipment or part of the shape model is used as feature content of the plant equipment spatial shape model to carry out grouping of measured values of the distribution measurement image data on the projected image of the plant equipment spatial shape model so that they are divided into measured values in an area included in the projection area of image and measured values in an area except for the above, thus making it possible to use ratio with respect to total variance of between-class variance calculated by the grouping as similarity for determining an area at the distribution measurement image data corresponding to the projected image of the selected equipment/part.

Further, an equipment monitoring apparatus of this invention is adapted so that distribution measurement image data positioning means calculates moment correlation between image data obtained by edge-extracting distribution measurement image data by Sobel operator and image data in which a projected image indicating outline (contour) of equipment or part of the plant equipment spatial shape model is caused to correspond to distribution measurement image data to allow values of pixels of distribution measurement image data located at the position including the outline to be 1 and to allow values of pixels except for the above to be 0 to adjust the viewpoint position and its viewing angle with respect to the projected plant equipment spatial shape model to determine a projected image of the plant equipment spatial shape model where the moment correlation is maximum.

In addition, the equipment monitoring apparatus of this invention is adapted so that distribution measurement image data positioning means inputs two-dimensional distribution measurement image data from a distribution measurement unit for measuring a distribution of state quantities of plant equipment to determine position and direction of the distribution measurement unit by using any of the previously described methods on the basis of the plant equipment spatial shape model data. Texture-mapping means allows the distribution measurement image data to undergo texture-mapping onto the equipment or part surface of the plant equipment spatial shape model on the basis of the position and the direction of the distribution measurement unit determined by the distribution measurement image data positioning means. Projecting means describes a projection chart (drawing) of the texture-mapped plant equipment spatial shape model by the texture-mapping means to display it on a display unit. Thus, even distribution measurement image data where position and direction of the measurement equipment are unknown can be caused to easily undergo positioning so that it is in correspondence with the plant equipment spatial shape model. In addition, since such data is displayed in a manner caused to undergo texture-mapping onto the equipment or parts surface, it is possible to visually easily grasp the equipment state.

BRIEF DESCRIPTION OF THE DRAWINGS

FIG. 1 is a flowchart which shows the content of distribution data overlay algorithm of the present invention.

FIGS. 5(a) and 5(b) are explanatory views showing differential operators.

FIGS. 6(a) and 6(b) are explanatory views showing viewpoint parameter.

FIG. 8 is a flowchart showing the procedure for automatic positioning.

FIG. 19 is a block diagram showing an equipment monitoring apparatus of an embodiment of the present invention.

FIG. 21 is a flowchart showing another example of the operation of the distribution measurement image data positioning means 2 of the equipment monitoring apparatus shown in FIG. 19.

FIG. 24 is a view showing an example of display when the distribution measurement image data shown in FIG. 3 is represented by image.

FIG. 31 is a flowchart showing a further example of the operation of the distribution measurement image data positioning means 2 of the equipment monitoring apparatus shown in FIG. 19.

FIG. 33 is a flowchart showing a further example of the operation of the distribution measurement image data positioning means 2 of the equipment monitoring apparatus shown in FIG. 19.

FIG. 34 is a flowchart showing a further example of the operation of the distribution measurement image data positioning means 2 of the equipment monitoring apparatus shown in FIG. 19.

FIG. 39 is a flowchart showing a further example of the distribution measurement image data positioning means 2 of the equipment monitoring apparatus shown in FIG. 19.

FIG. 42 is a view in which FIG. 40 and FIG. 41 are overlaid.

FIG. 43 is a flowchart showing a further example of the operation of the distribution measurement image data positioning means 2 of the equipment monitoring apparatus shown in FIG. 19.

FIG. 45 is a block diagram showing an example of the equipment configuration of the equipment monitoring apparatus shown in FIG. 19.

DETAILED DESCRIPTION OF THE PREFERRED EMBODIMENTS

A preferred embodiment of the present invention will now be described with reference to FIG. 1. FIG. 1 shows the procedure in which, in the present invention, a laser vibration meter is used to carry out surface measurement of vibration distribution data to display its measurement result in the state overlaid on three-dimensional CAD image data. The overlay (superposition) procedure is roughly classified, as shown in FIG. 1, into two parts:

(1) positioning of distribution data with respect to three-dimensional CAD data of distribution data, and (2) extraction mapping of distribution data.

In carrying out positioning (alignment) of the distribution data with respect to the three-dimensional CAD data, an approach is employed to display a measured two-dimensional parameter distribution as an image to display an image in which three-dimensional CAD data of the equipment is overlaid (superposed) thereon, thus to indicate correspondence between the equipment and the image. For example, such a positioning is performed as follows.

First, at step S1, measurement data of vibration distribution, and measurement condition such as measurement position, etc. at that time are taken in. The vibration distribution data is displayed as image data by converting values of parameters into color or luminance. In addition, at step S2, equipment arrangement is simultaneously displayed by three-dimensional CAD data on the basis of measurement condition such as measurement point coordinates, measurement direction, and angle of visual field, etc. The three-dimensional CAD data relating to the equipment is prepared in advance. Because there is any error in the measurement condition such as measurement position, etc. edge extraction of image is carried out at step S3. Then, at step S4, positioning of the image of the measurement data and the three-dimensional CAD image is carried out so that they are in correspondence with each other.

Then, in the extraction mapping of the distribution measurement data, measurement data corresponding to selected equipment of which state is to be monitored is extracted at step S5. Then, at step S6, the measurement data thus extracted is caused to undergo mapping onto a three-dimensional CAD image to display parameter distribution of the equipment to be monitored.

Figure 2:
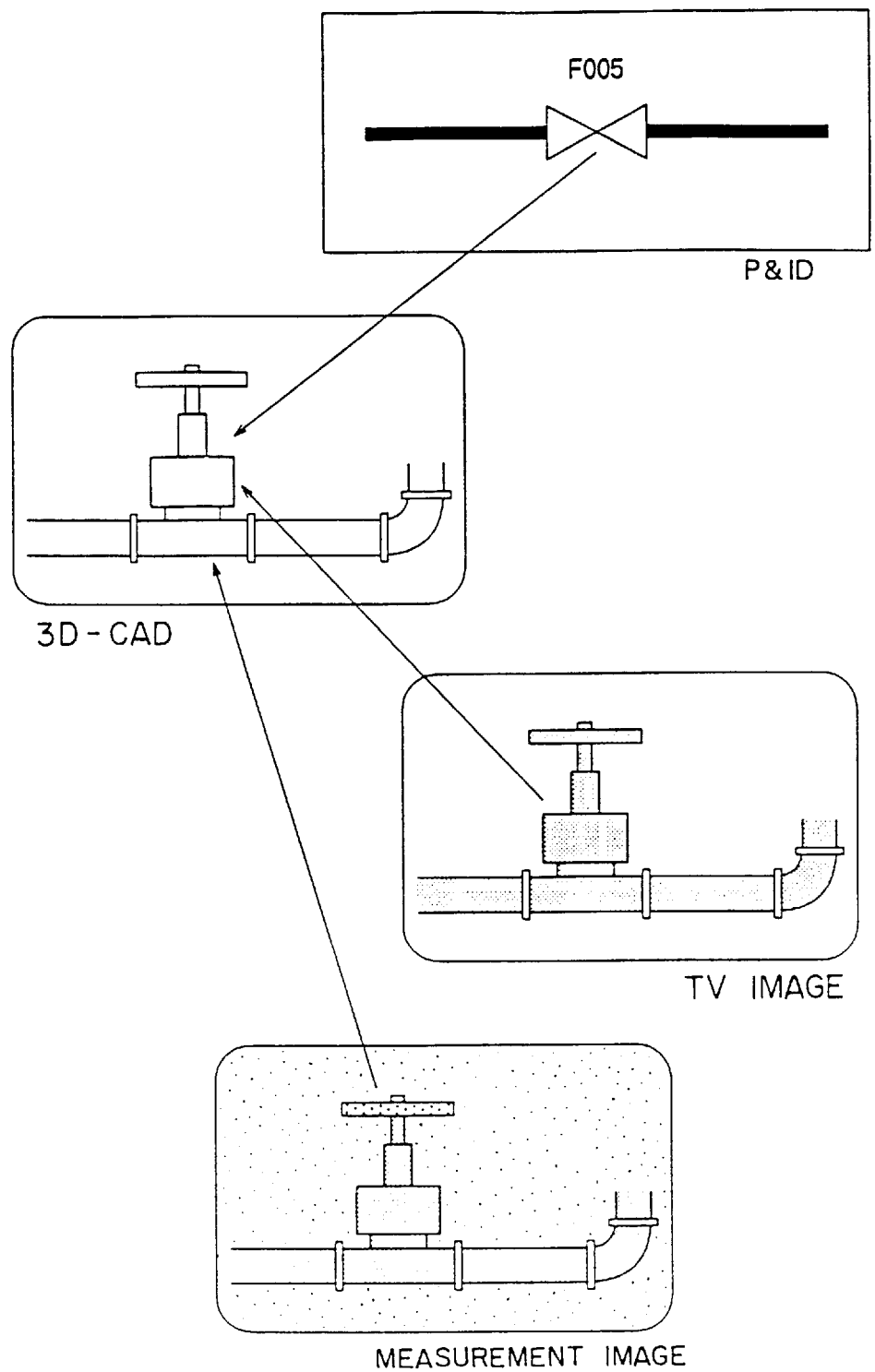
FIG. 2 is an explanatory view which illustrates an example of display pictures for selection of equipment.

FIG. 2 shows pictures on screen from which an equipment to be inspected can be specified, that is, a picture on screen which displays the plant piping instrumentation diagram (hereinafter referred to as P&ID), a picture on screen showing TV image of the equipment, a picture on screen showing distribution measurement data image, and a picture on screen showing the three-dimensional CAD image. By using these pictures on screen, designation/selection of an equipment to be inspected is carried out. By allowing the P&ID and the three-dimentional CAD image to correspond to each other, it is possible to recognize, on the spot, the name and features of an equipment to be inspected. It is also possible to designate an equipment that an operator desires to observe by making use of the TV image, etc.

After selection, measurement data from a corresponding equipment is mapped onto a selected equipment, thus to display the equipment to be inspected. Since measurement data is only in one direction, in the case where it is necessary, after making a judgment on the basis of the measurement data from the equipment to be inspected, to have data from a different direction, these processing steps are repeated. Then, at step S7, judgment of unusual condition by parameter values is carried out. By such judgment, it is possible to intuitively recognize distribution measurement data required for diagnosis of equipment on the basis of three-dimensional shape of the equipment.

Figure 3:
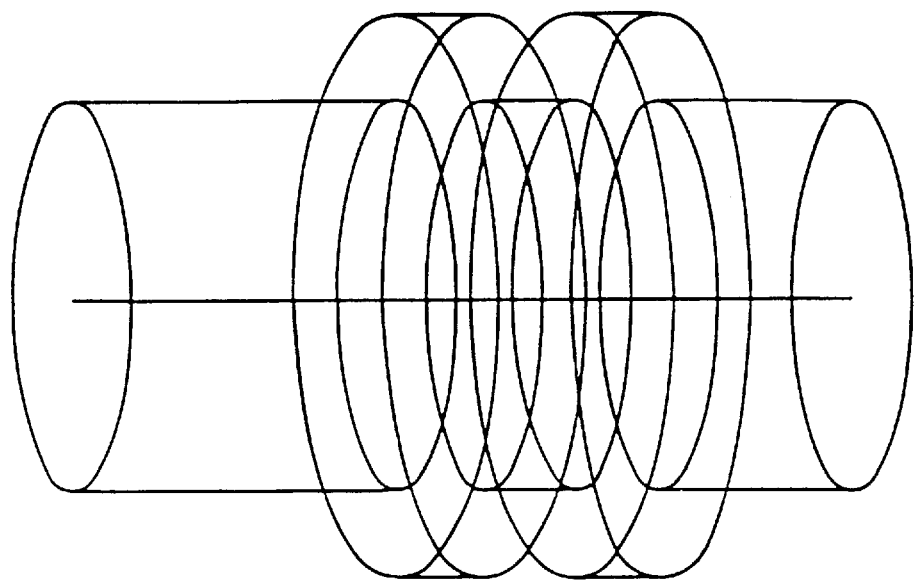
FIG. 3 is an explanatory view showing an example of a wire frame display of a pump by three-dimensional CAD.
Figure 4:
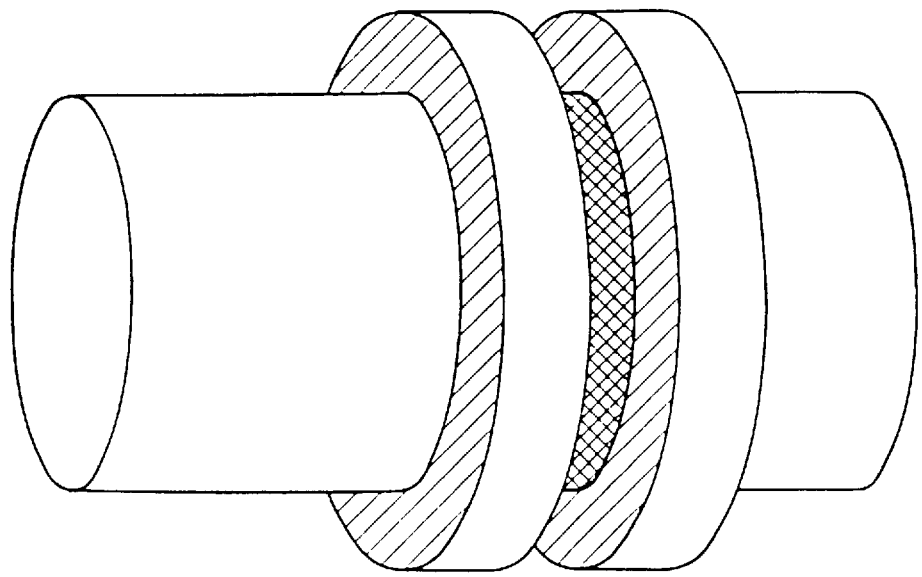
FIG. 4 is an explanatory view showing an example of a surface display of a pump by three-dimensional CAD.

The overlay algorithm will now be described in detail with reference to FIGS. 3 and 4.

The three-dimensional CAD data which is to be overlaid onto measurement data of the vibration distribution can be represented by a wire frame display or surface display. The wire frame display, which provides a simple representation of shape by lines only, is suitable for quick display of outline of the shape of equipment, and the surface display, which provides a representation of the outer surfaces of the shape, is suitable for displaying an equipment in a somewhat realistic manner. Simple examples are given in FIGS. 3 and 4, wherein FIG. 3 shows wire frame display of three-dimensional CAD data of the flange portion, and ND FIG. 4 shows surface display thereof.

In the both figures, because the three-dimensional CAD data and measurement data are subjected to overlay display, it is possible to establish the correspondence relationship between the equipment and the measurement data. At this time, positioning is carried out by adjusting the display condition of the three-dimensional CAD data.

As the positioning method, there are three methods what are so called (1) manual adjustment, (2) semi-automatic adjustment, and (3) automatic adjustment.

[Positioning by manual adjustment]

Manual adjustment is a method of adjusting, by manual operation, display parameters of the graphic by the three-dimensional CAD data to allow the three-dimensional CAD image obtained by such adjustment to be in correspondence with the measurement image. Movement of the resulting display is carried out by adjustment of parameters of measurement point and angle of visual field. In this case, by designating position of slider displayed within a picture on screen by means of a mouse, it is possible to adjust x, y and z coordinates of viewpoint and the measurement direction.

[Positioning by semi-automatic adjustment]

The semi-automatic adjustment is a method of manually designating representative points to automatically carry out conversion for overlay (superposition).

In the semi-automatic adjustment method, there is adopted a procedure, when carrying out alignment of measurement data and three-dimensional CAD data, to determine points of designation to be aligned to determine parameter values for correspondence operation by the least squares method. As occasion demands, in order to clarify the outline (contour) of the object to be measured, extraction of edges of an image is carried out. Such edge extraction is performed by applying the gradients or Sobel operators, etc. as shown in FIG. 5 to displayed image. The edge extraction may be performed, e.g., by differential operation with respect to pixels of 3×3 of the two-dimensional measurement data.

Step A-1

An image and three-dimensional CAD image are displayed simultaneously. As occasion demands, edge extraction processing of the image is carried out, thereby providing a display facilitating establishment of correspondence between the image and the three-dimensional CAD image.

Step A-2

Points on the three-dimensional CAD image to be aligned are selected by picking. The procedure therefor is as follows.

1) Points which present feature (vertices which appear on the surface) are selectively displayed.

2) A mouse or the like is used to select the feature point pi=(xi, yi, zi) to be aligned.

3) The coordinates of the selected point are preserved (stored).

Step A-3

A mouse or the like is used to select, by picking, a point on the image to be aligned. The procedure therefor is as follows.

1) A mouse or the like is used to select a point qi=(x'i, y'i, z'i) which corresponds to the selected point pi.

2) A point to be selected is displayed on the image.

3) The coordinates of the selected point qi are preserved.

Step A-4

Steps A-2 and A-3 are repeated for the required number of points (i-1, 2, 3, . . . , 9).

Step A-5

Position vector v and direction $(\theta, \phi)$ of the viewpoint as shown in FIG. 6 are determined so that the three-dimensional CAD image and the image are overlaid. In this case, $(v, \theta, \phi)$ such that $qi=PV(v, \theta, \phi)Mpi$ is calculated by the least square method, wherein M, V, and P are the transformation matrices for modeling, viewing, and projection, respectively.

Step A-6

The three-dimensional CAD image is moved, transformed, and re-displayed.

The algorithm for calculating parameters of the position and direction of the viewpoint at step A-5 is as follows.

Step 5-1

The initial value $X_0$ for the position and direction of the viewpoint is inputted.

$$X_0 T = [v_0, \theta_0, \phi_0] \quad (1)$$

Where $v_0$: Viewpoint initial value $(vx_0, vy_0, vz_0)$ $\theta_0, \phi_0$: Initial values of viewpoint direction angle Let now consider parameters of position and direction of the viewpoint of parameters to be estimated. Because the viewing angles $(\alpha_x, \alpha_y, \alpha_z)$ are intrinsic data in the measuring instrument, they are set to fixed values. However, even if $\alpha_x, \alpha_y$, etc. are unknown, they can be determined in a manner similar to other parameters.

Step 5-2

N pairs of points to be aligned are inputted. Each of the points is defined as follows.

The image coordinates are as follows.

$$yi^m = (xi^m, yi^m) \quad (2)$$

The three-dimensional CAD coordinates are as follows.

$$xi = (xi, yi, zi), i=1, 2, 3, \ldots, N \quad (3)$$

Step 5-3

The method of least squares is used to change the viewpoint and viewing angle vector X by an amount $\Delta X$ so that the evaluation function given below is minimized.

$$I = \frac{1}{2} \sum_{i=1}^{N} (y_i^m - y_i)^T W_i (y_i^m - y_i) \quad (4)$$

In the above, $W_i$ is the weighting matrix which represents error in the position setting.

The calculation procedure is as indicated below by the method of steepest descent. In consideration of convergence, other methods may be also used.

1) Determine the gradient $\partial I/\partial X$.

$$\frac{\partial I}{\partial X} = \sum_{i=1}^{N} \left( -\frac{\partial y_i}{\partial X} \right)^T W_i (y_i^m - y_i) \quad (5)$$

2) Determine the component of change $\Delta X$ in the vector X.

$$\Delta X = -\epsilon \frac{\partial I}{\partial X} \quad (6)$$

3) Update the vector X.

$$X_{n+1} = X_n + \Delta X \quad (7)$$

4) Execute steps 1), 2), and 3) until the condition $|\Delta|X < \epsilon_0$ is satisfied.

At this point, the relationship between the point yi within the picture on screen and the point xi in the three-dimensional space is expressed below by the viewpoint variable (viewing transformation) and the mapping transformation (perspective transformation) to a two-dimensional image space.

$$y_i = f(x'_i) \quad (8)$$

;perspective transformation $$-F_1 x'_i/z'_i \quad F_1 = \cot(\alpha_x/2)$$
$$-F_2 y'_i/z'_i, \quad F_2 = \cot(\alpha_y/2)$$

$$x'_i = R_X(\phi) R_Y(\theta)(x_i - v) \quad (9)$$

;viewing transformation

Where:
Rx ($\phi$) is rotation through an angle of $\phi$ about the X axis, and Ry ($\theta$) is rotation through an angle $\theta$ of about the Y axis.

Accordingly, the gradient of Equation (5) can be calculated as follows.

$$\frac{\partial y_i}{\partial X} = F \frac{\partial x_i}{\partial X} \quad (10)$$

In the above equation:

$$F = \begin{array}{l} -F_1/z'_i, 0, -F_1 x'_i/(-z'_i)^2 \\ 0, -F_2/z'_i, -F_2 y'_i/(-z'_i)^2 \end{array} \quad (11)$$

Step 5-4

Once the converged $X_{n+1}$ has been determined, the viewpoint direction $P_{n+1}$ is determined and the three-dimensional CAD image is displayed again for a verification.

$$P_{n+1} = (p'x, p'y, p'z) \quad (12)$$

In which:

$$p'x = vx + \cos\phi\sin\theta \quad (13)$$
$$p'y = vy + \sin\phi$$
$$p'z = vz + \cos\phi\cos\theta$$

Figure 7:
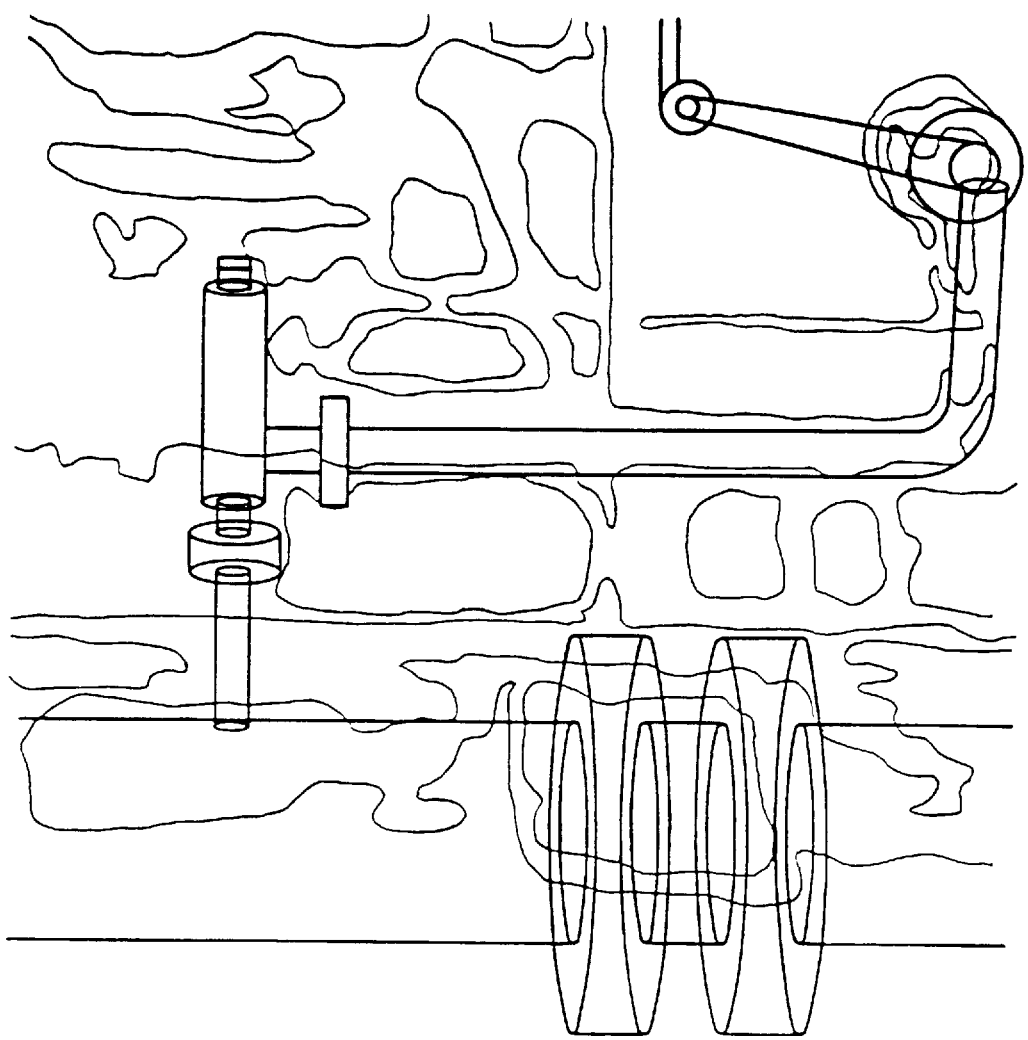
FIGS. 7 is an explanatory view showing an example of an overlay display of a vibration distribution and a three-dimensional CAD display in the case where a pump is taken as an example.

FIG. 7 is an overlaid display of the vibration distribution in the vicinity of the valve of a pump, and the three-dimensional CAD display. It is possible to allow the two-dimensional image and the three-dimensional CAD image to be overlaid by designating feature such as flange, etc.

The alignment (positioning) of the two-dimensional image of measurement data and the three-dimensional model of the shape of the equipment is shown for the case of the manual method, in which the adjustment of position and direction of the viewpoint is performed manually, and the semi-automatic method, in which a number of points which are to be overlaid are designated to set position and direction of the viewpoint by calculation.

[Positioning by automatic adjustment]

The automatic adjustment is a method of determining representative points by extraction of image edges and extraction of feature points to completely automatically overlay such portions.

FIG. 8 shows the algorithm for fully automatic positioning with no human intervention.

In this procedure, at step S11, an measurement image is inputted. At step S12, edge extraction is performed on this image. At step S13, straight-line tracing is performed. In addition, at step S14, feature points are extracted.

Figure 9A:
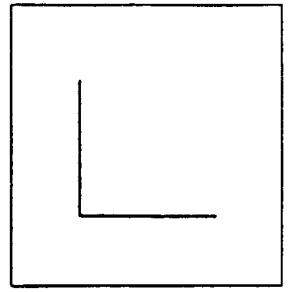
FIGS. 9(a), 9(b), and 9(c) are explanatory views showing examples of feature points.
Figure 9B:
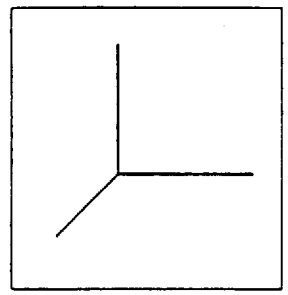
Figure 9C:
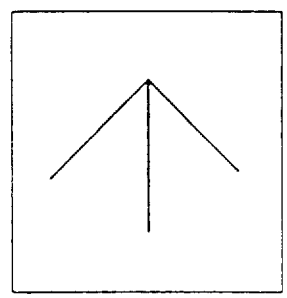

As feature points, it is possible to take, for example, the corners of a rectangular solid, such as shown in FIGS. 9(*a*), 9(*b*), and 9(*c*).

Turning back to FIG. 8 for a second time, at step S15, similarity between a window which includes feature points and an image generated by means of a three-dimensional shape model is evaluated by using the correlation coefficients. At step S16, the image having the minimum correlation coefficient is judged as the point of correspondence. Then, at step S17, the viewpoint coordinates and viewpoint position are calculated from the points of correspondence of the images by the above-described method.

Figure 10:
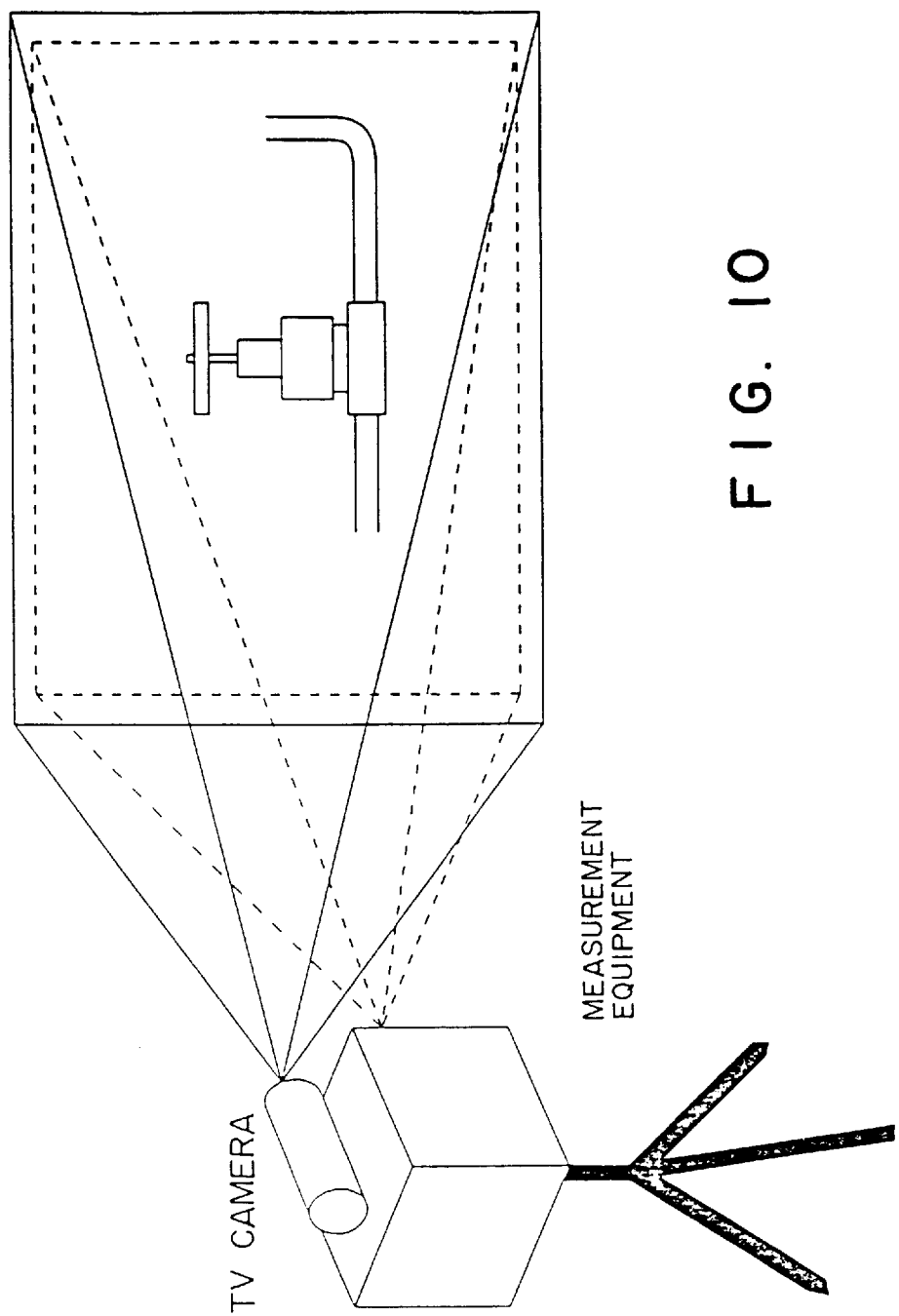
FIG. 10 is an explanatory view showing the relationship between measurement equipment and TV camera.

FIG. 10 shows another method of overlay (superposition) of the measurement image and the three-dimensional shape model shown in FIG. 8 and FIG. 9, wherein there is conducted positioning with respect to a TV camera in which position with respect to a measurement equipment, measurement direction, and measurement visual field angle are known.

Figure 11:
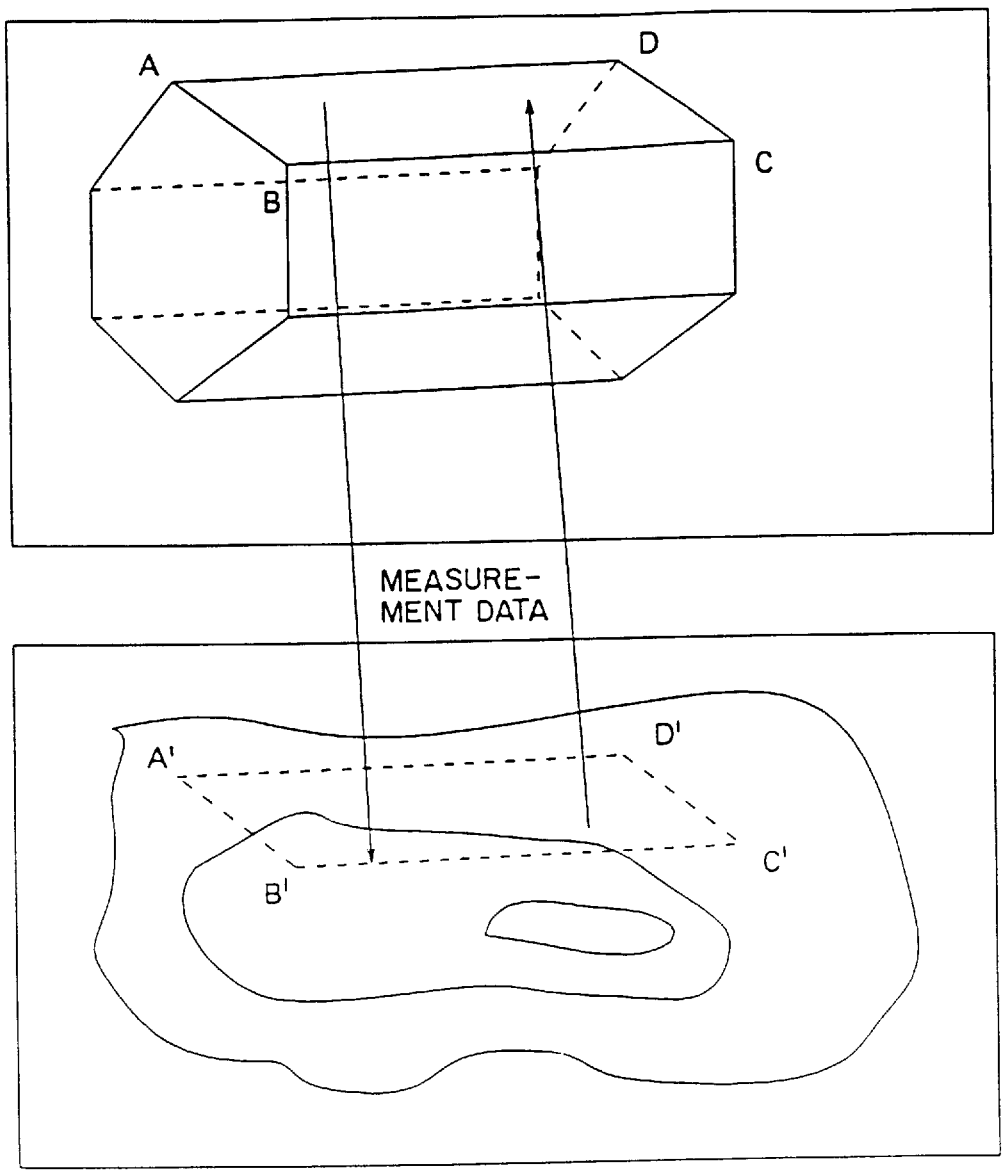
FIG. 11 is an explanatory view showing a way of mapping.

FIG. 11 shows mapping display onto the equipment to be inspected of image data. The mapping display is carried out by a procedure to first carry out selection of parts on the three-dimensional CAD image thereafter to allow measurement data to undergo mapping onto a designated primitive (displayed basic graphic).

The algorithm for parts selection from the three-dimensional CAD image is as indicated by the following steps 1), 2), and 3).

1) Names are assigned to respective parts thus permitting them to be picked.
2) When a part is picked, the part is caused to blink on the display.
3) After "verification", only that part is displayed.

At this point, designation may be made even from pictures on screen of P&ID, TV image, and measurement data as previously described.

The mapping onto the equipment to be inspected of image data is carried out, as shown in FIG. 11, by carrying out mapping onto respective primitives of the three-dimensional CAD image constituting the equipment to be inspected. For example, vertices A, B, C and D which constitute a surface of a primitive are first transformed into corresponding vertices in the two-dimensional measurement image space. The measurement data in the region surrounded by the transformed vertices A', B', C', and D' are mapped onto the plane A-B-C-D. A judgment is then made as to whether or not this plane is plane of the surface side of the primitive, and if it is the plane of the surface side, the image data is mapped onto this plane, but if it is plane of the back side, this is not carried out. Parts that are hidden by other objects are corrected to reflect this.

The algorithm for this correction is summarized as follows.

1) Only planes of the surface sides of planes of the primitive are selected.

Numbers are assigned to the selected planes, starting at the top (high z values).

2) The coordinates of the selected surface plane are transformed into image coordinates. This transformation is performed by the following equation.

$$P'i = PVMPi \quad (14)$$

Where:
P'i: Image coordinates (x'i, y'i)
Pi: Three-dimensional CAD coordinates (xi, yi, zi)
M: Modeling transformation matrix
V: Viewing transformation matrix
P: Perspective transformation matrix 3) The image is mapped onto a polygon, which is the smallest unit in the three-dimensional CAD image, starting from the top (in terms of z value). After undergone mapping, the mapped area of the image is painted "black" (shadow area color).
4) Respective primitives are permitted to be preserved (stored) and re-displayed so as to include texture. As image data, mapped image data and image data which have not yet been mapped may be preserved.

Figure 12:
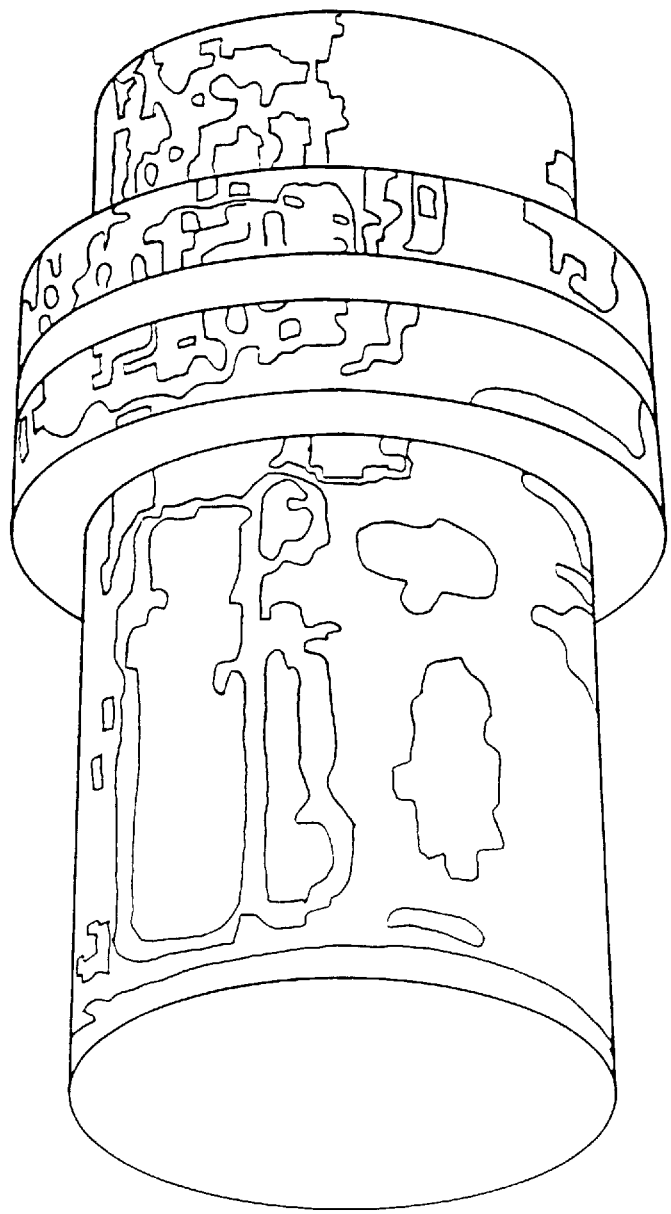
FIG. 12 is an explanatory view showing an example of mapping of a vibration distribution image onto a piping.

FIG. 12 is shows an example of mapping onto a piping which is made up of a combination of cylinder primitives. If the mapped image data is compared with past image data, it is possible to judge unusual condition of the equipment on the basis of differences therebetween. In addition, when an approach is employed to read data values at points to be inspected of the equipment from the image data to display a trend thereof, it is possible to judge an unusual condition of the equipment by such an approach as well.

Figure 13:
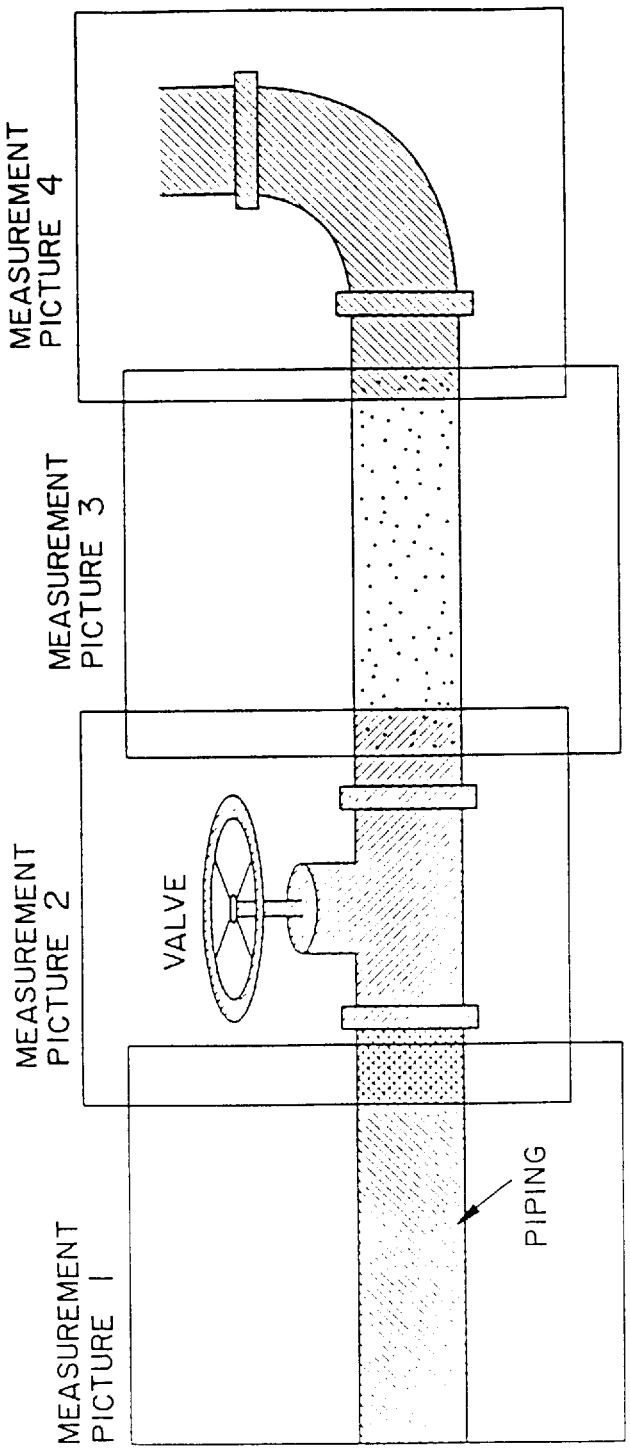
FIG. 13 is an explanatory view showing an example of mapping of a vibration distribution image onto an elongated piping.

FIG. 13 shows the state where plural successive images (pictorial images) of an elongated object such as piping are caused to undergo mapping onto a three-dimensional CAD image. Thus, it is possible to display distribution of the entire distribution of vibration measurement data.

Figure 14:
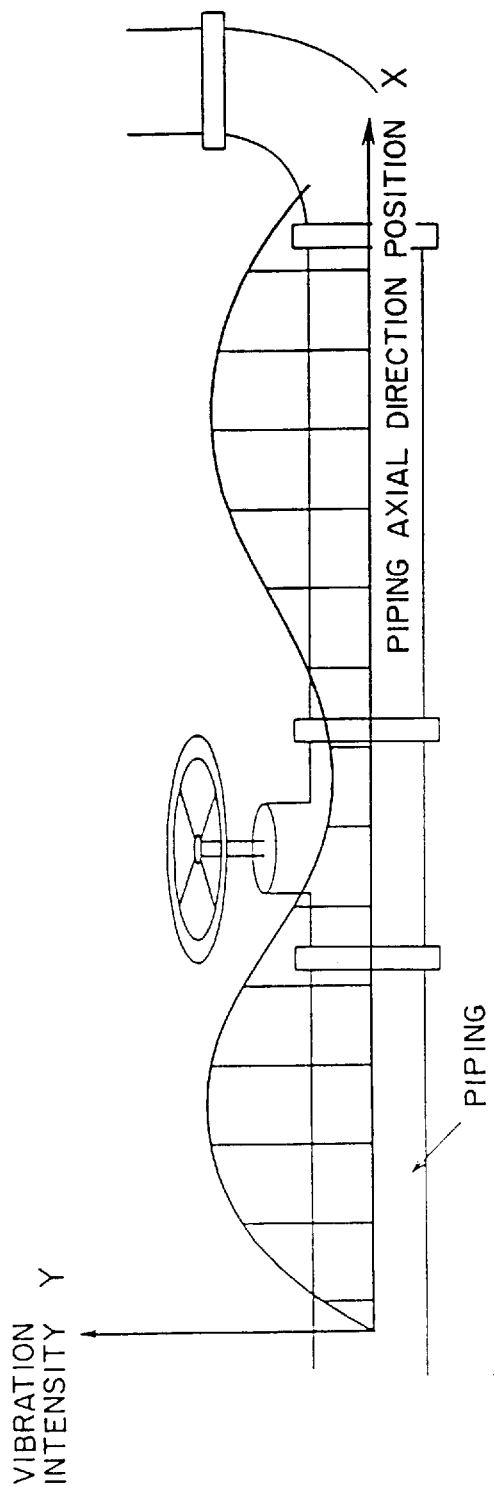
FIG. 14 is an explanatory view showing a vibration mode of a piping.

FIG. 14 is a view obtained by X-Y plotting, as a graph, with respect to the distribution of the vibration measurement data, data along a designated direction of the piping or equipment to display vibration mode to represent the characteristics of the vibration.

While, in the above-described embodiment, measurement data are displayed on the basis of three-dimensional shapes by their projection charts, three-dimensional shape models onto which measurement data has been subjected to mapping may be displayed by three views from different directions, such as top, front and side views.

[Other Embodiment (1)]

While, in the above-described embodiment, the method for equipment state monitoring/diagnosis of unusual condition with respect to vibration distribution data have been described, there may be employed, similarly to the vibration distribution data, temperature measurement data from an infrared camera, visible light image data from a TV camera, or sound source power distribution data from a three-dimensional acoustic sensor. If parameters of these data are transformed into colors or luminance, their actual processing performed are basically the same as that of the vibration distribution data, thereby enabling the same type of processing as in the case of vibration distribution data.

[Other Embodiment (2)]

Figure 15:
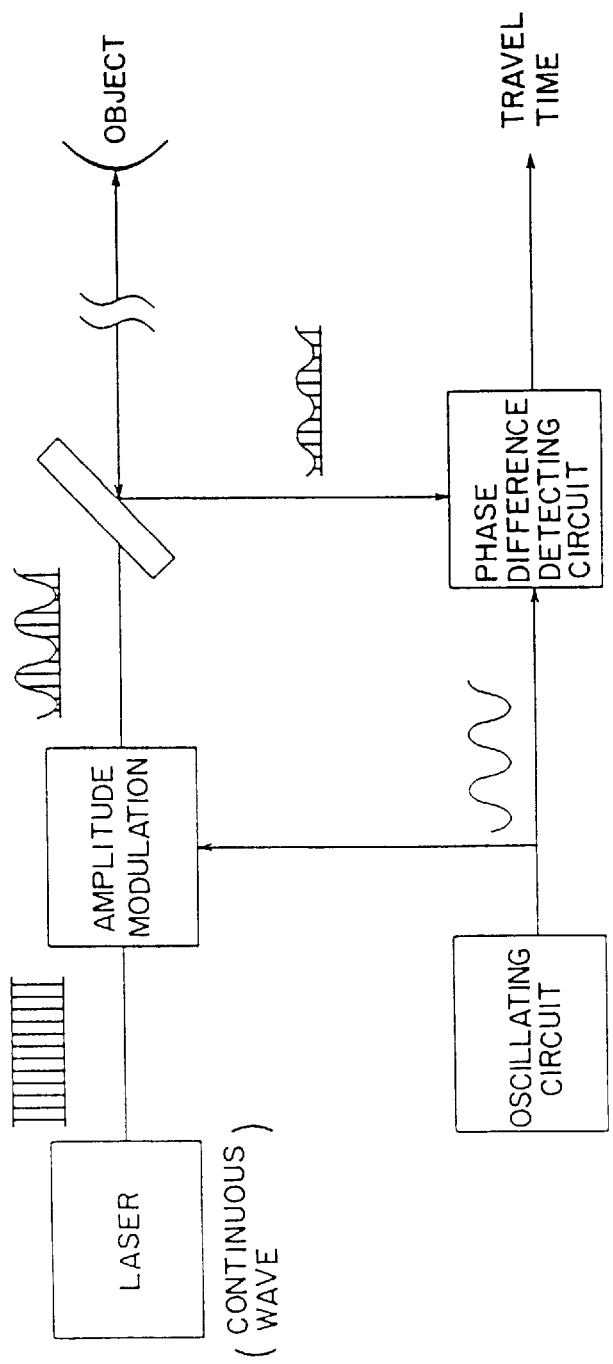
FIG. 15 is an explanatory view showing the configuration of a laser range finder.

While, in the above-described embodiment, three-dimensional CAD data which represents the shape of the equipment by combination of basic graphics as the model of the shape of an equipment to be inspected, an approach may be employed such that a laser range finder is used to measure the actual shape of the equipment for representation of the model. The laser range finder is adapted, as shown in FIG. 15, for example, to amplitude-modulate laser continuous waves to output laser beams with respect to object to detect a phase difference between the original light and a reflected light from the object to convert (change) it into the travel time, that is, into distance information. By scanning the object with the laser beams, it is possible to obtain the shape of the object.

If measurement data is caused to undergo mapping with the equipment shape measured in a manner as described above being as the model of the equipment, it is possible to easily achieve an understanding of the state of the vibration distribution, etc. of the equipment. In the case of the method of preparing a model by using laser beams, because three-dimensional CAD data, etc. is not required beforehand, more flexibility is possible in modeling equipment. In addition, it is possible to input more detailed shapes which cannot be represented by the three-dimensional CAD data to display them.

Figure 16:
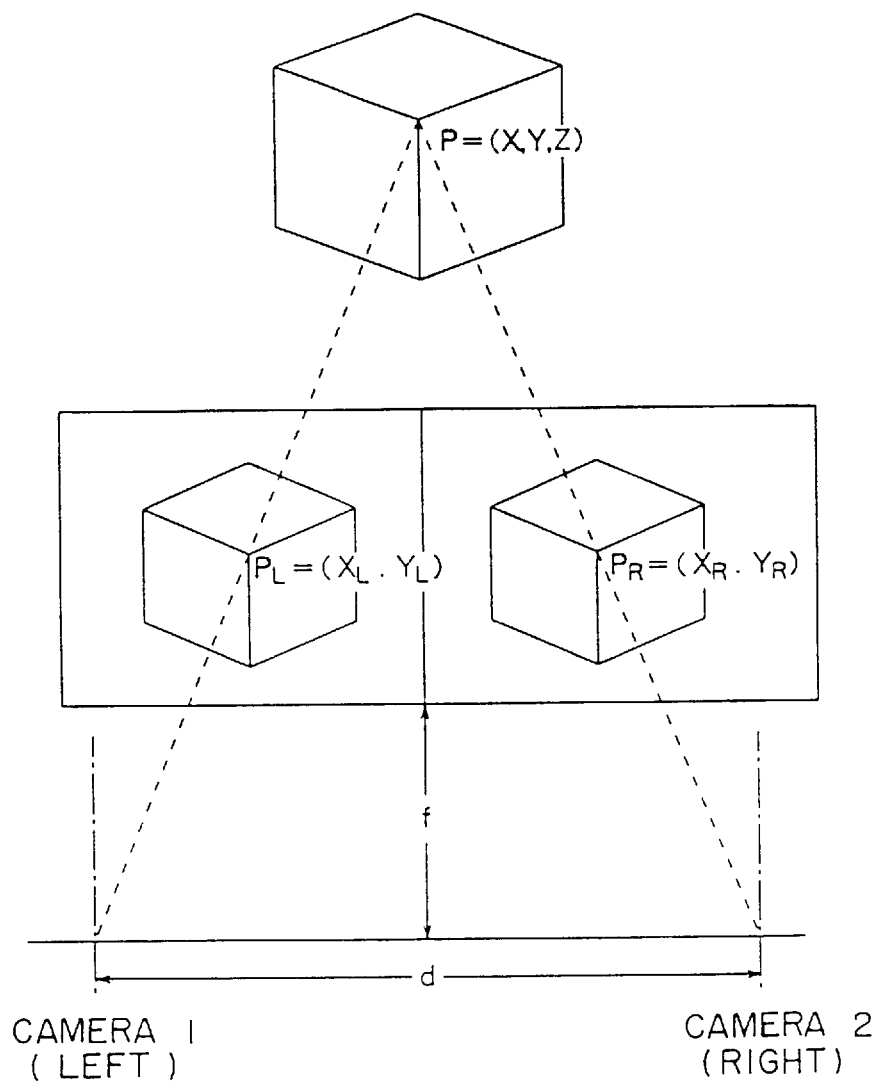
FIG. 16 is an explanatory view showing the principle of stereoscopic vision.

FIG. 16 shows an example of stereoscopic vision to measure a three-dimensional shape by using two TV images in accordance with a method of stereoscopic vision. In the stereoscopic vision, as shown in FIG. 16, the distance up to point P is calculated by the following formula by determining the corresponding points $P_L(X_L, Y_L)$ and $P_R(X_R, Y_R)$ of both images in two images by cameras installed in a manner spaced by a distance of d.

$$f - z = \frac{fd}{X_L - X_R} \tag{15}$$

In the above formula, f is the distance between the focal point of the camera and the image.

Points of coincidence of the two images are determined, similarly to the case of overlaying (superposition) of the measurement image and the image by the three-dimensional shape model, by extracting feature points of the image to take the correlation between a window around these feature points and a window of the image to be overlaid.

In this method, because the three-dimensional shape can be recognized from only TV images, it is possible to obtain the shape by means of a low-cost apparatus.

[Other Embodiment (3)]

While, in the above-noted embodiment, it is assumed that measured values from detectors were not dependent upon the inclination of the object or the surface reflectivity, in the case where there is a large difference in surface inclination or reflectivity, it is necessary to compensate for this.

Figure 17:
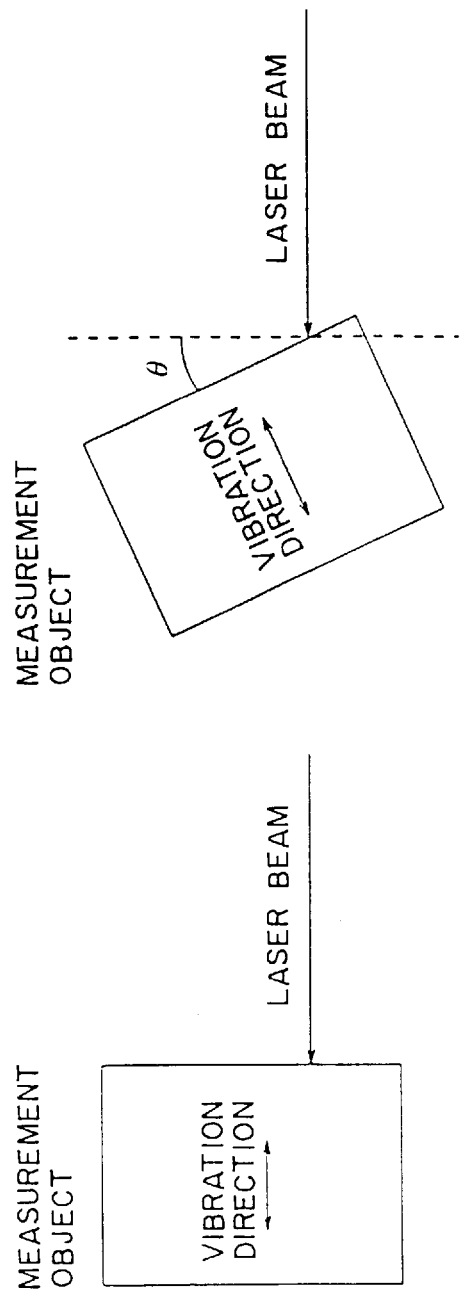
FIG. 17 is an explanatory view showing the relationship between inclination of an object and measurement direction.

FIG. 17 shows an example in which an object is vibrating in a direction vertical to the measurement plane, and the inclination of the measurement plane is $\theta$. In the case of a laser vibration meter, if the surface of the object measured is perpendicular to the laser direction, there is no need for compensation, but if it is inclined at an angle of $\theta$ as in this case, since the component in vertical direction takes a value which is multiple of $\cos \theta$, the actual velocity Vnorm of the vibration is corrected as follows.

$$Vnorm = Vmes/\cos \theta \tag{16}$$

In the above formula, Vmes is the velocity of the vibration measured.

Thus, even if laser beams are not necessarily irradiated to the vibration surface in a manner vertical thereto, it is possible to measure the vibration of an object.

In the case of temperature measurement using an infrared sensor, it is possible to measure the temperature with good accuracy by compensating for reflectivity of infrared ray. When the standard reflectivity is FO and the reflectivity of the object to be measured is Fobs, the measured temperature in which reflectivity has been corrected is given as Tmod by the following formula.

$$Tmod = Tmes \cdot (Fobs/FO) \tag{17}$$

In the above formula, Tmes is the directly measured temperature (°C.).

[Other Embodiment (4)]

While, in the above-described embodiments, only one type of measurement value was used in determining an unusual condition, it is also possible to make judgment by using a plurality of measurement values. For example, when the method in which unusual condition is judged by respectively independently using only vibration amplitude and temperature and the method in which unusual condition is judged by combination of vibration and temperature, the latter method makes it possible to carry out more precise judgment.

Figure 18:
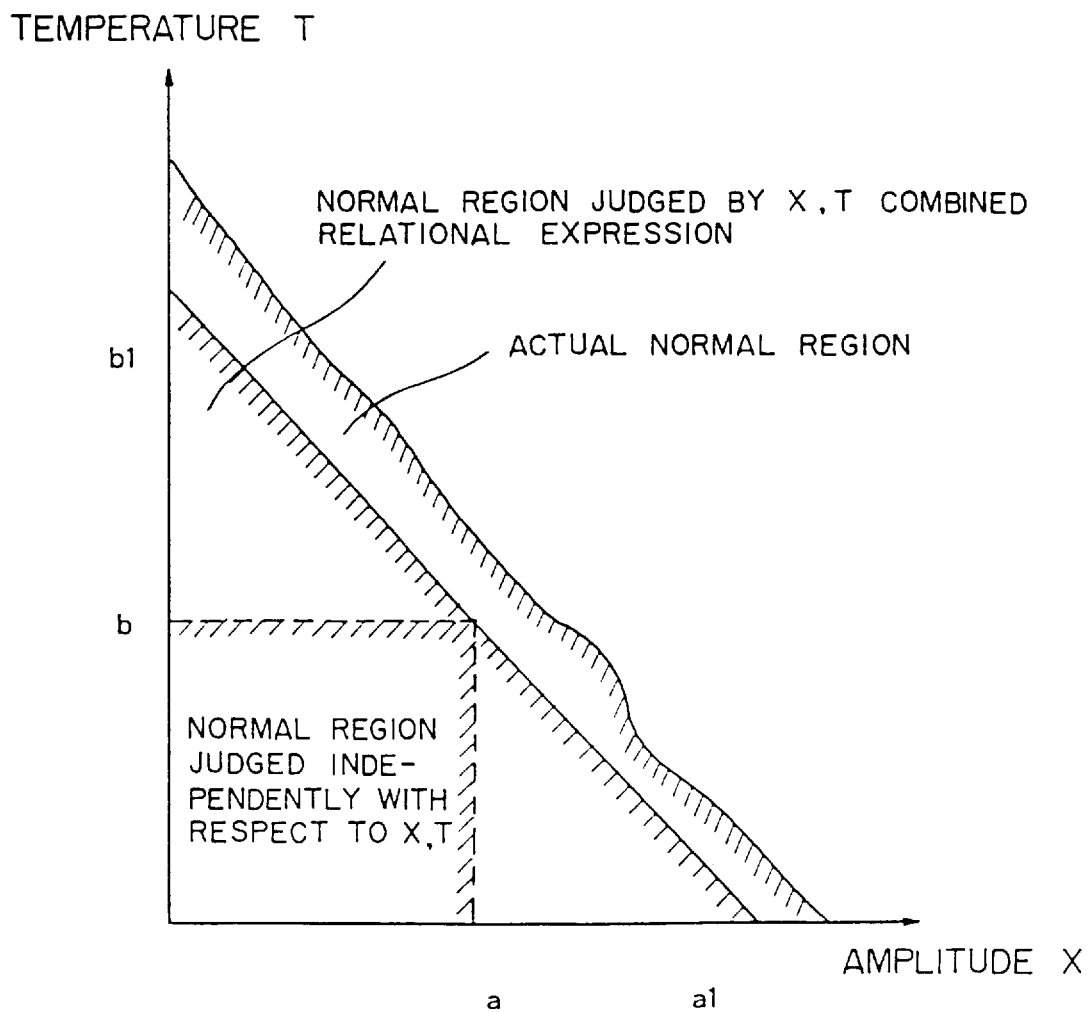
FIG. 18 is an explanatory view showing difference between judgment criteria of unusual condition.

FIG. 18 illustrates these two types of criteria of judgment of unusual condition. In the case where the amplitude x and the temperature T are used to make independent judgments, if the region x<a is the normal region of amplitude, and the region T<b is the normal region of temperature, the region satisfying both "x<a and T<b" is the normal region judged by two parameters This is shown by the region inside dotted lines of FIG. 18. On the other hand, it is possible to determine the relationship between the amplitude and temperature which indicate normal values, it is possible to define the normal region on the basis of such relationship. A relationship such that the normal region of current measured value (X, T) is expressed as X/a1+T/b1<1 on the X-T plane is determined, thus making it possible to judge normal and unusual conditions by this map. By such an approach, it is possible to establish judgment area of the normal/unusual conditions with greater accuracy.

Namely, when judgment is carried out independently by respective parameters, it is necessary to set threshold values of unusual condition, e.g., a and b from a viewpoint of maintenance. On the other hand, in the case where the relationship between a plurality of parameters is determined to judge unusual condition, it is possible to allow the normal region to be greater as compared to the case where the judgment is made independently every respective parameters. as a result, an erroneous judgment of unusual condition and useless inspection of the equipment can be reduced. Thus, this is advantageous from an economical point of view.

Furthermore, even if any number of parameters equal to or greater than two are used as parameter in the judgment, they can be treated in the same way. While the example of the relational expression of X/a1+T/b1<1 was given in the above-described embodiment, such relational expression can be used in a manner as described above as relational expression indicating normal region.

As described above, the present invention employs a scheme to carry out alignment of the distribution measurement image data and three-dimensional spatial model to allow the distribution measurement data to undergo mapping thereonto. Thus, it is possible to intelligibly display the operating state of equipment, thus resulting in the ability to easily and properly judge the state of the equipment. As a result, it is possible to facilitate the monitoring of the state of the equipment of interest and the judgment of unusual condition.

FIG. 19 shows an embodiment of an equipment monitoring apparatus according to this invention. This equipment monitoring apparatus comprises a distribution measurement unit 1 for measuring state quantities (parameters) such as temperature, vibration and/or sound, etc. of the plant equipment surface to be monitored, distribution measurement image data positioning (alignment) means for carrying out positioning of distribution measurement image data from the distribution measurement unit 1 and a projection chart (drawing) by a corresponding plant equipment spatial (three-dimensional) shape model to determine position and direction of the distribution measurement unit 1, texture-mapping means 3 for allowing distribution measurement image data obtained by the distribution measurement unit 1 to undergo texture-mapping onto the surface of the spatial shape model of the plant equipment on the basis of the position and the direction of the measurement unit determined by the distribution measurement image data positioning means 2, projecting means 4 for describing a projection chart of the texture-mapped plant equipment spatial shape model, and an image display unit 5 for displaying the projection chart from the projecting means 4.

In the above-described configuration, as the distribution measurement unit 1, there may be employed measurement equipment, e.g., infrared (ray) camera, laser vibration meter, or plural microphones, etc.

The distribution measurement image data positioning means 2 serves to determine position and direction of the distribution measurement unit 1 on the basis of distribution image data obtained by the distribution measurement unit 1 and a plant equipment spatial shape model prepared in advance. An example of the representative operation thereof is shown in FIG. 20.

Figure 20:
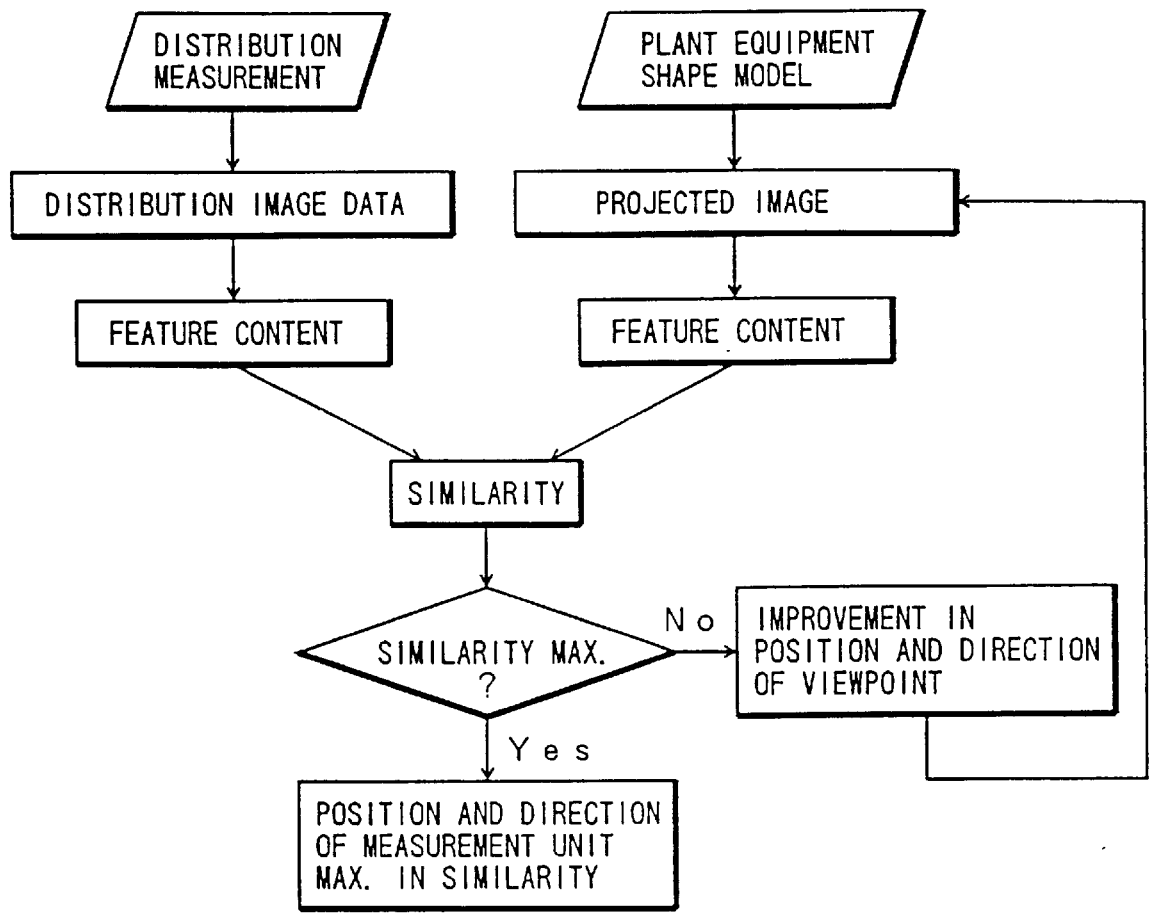
FIG. 20 is a flowchart showing an example of the operation of distribution measurement image data positioning means 2 of the equipment monitoring apparatus shown in FIG. 19.

In FIG. 20, the distribution measurement image data positioning means 2 determines feature content from distribution measurement image data obtained by measurement, and determines, by calculation, an image (pictorial image) projected on the plane by approximate position and direction of the viewpoint corresponding to position and direction of the measurement unit to determine feature content from the projected image. Further, the distribution measurement image data positioning means 2 calculates, from the determined feature contents of the both images, similarity therebetween to repeat an operation for adjusting approximate viewpoint and direction (viewing angle) of the projected image of the plant equipment spatial shape model so as to increase the above-mentioned similarly to determine viewpoint and direction where the similarity is maximum to determine them as the position and the direction of the measurement unit.

A processing method for determining feature content of the operations of the positioning means 2 shown in FIG. 20 will be described below in more detail.

FIG. 21 shows a first processing example of the operation shown in FIG. 20. In FIG. 21, there is shown a method in which measured values are used as feature content of the distribution measurement image data to allow the measured values to correspond to pixels of a projected image of the plant equipment spatial shape model to carry out grouping of these measured values every equipments in which pixels on the projected image of the spatial shape model are included to use, as similarity, ratio with respect to measured value total variance of measured value between-class variance by the grouping.

Here, when pixel of distribution measurement image data is i, its measured value is Xi, and the number of all pixels of the distribution measurement image data is N, average value $X_{AV}$ of all measured values is expressed as follows:

$$X_{AV} = (1/N)\Sigma Xi \quad (18)$$

From this expression, total variance Va is expressed as follows:

$$Va = \Sigma(Xi - X_{AV})^2 \quad (19)$$

Further, when set of all i corresponding to pixel positions included in equipment g within the projected image of the spatial shape model of the plant equipment is represented by g, the number of elements of the set g is Ng, and i within the set g is j, an average $(Xg)_{AV}$ of measured values of the set g is expressed as follows:

$$(Xg)_{AV} = (1/Ng)\Sigma Xj \quad (20)$$

Thus, the between-class variance Vc is expressed as follows:

$$Vc = \Sigma Ng((Xg)_{AV} - X_{AV})^2 \quad (21)$$

Figures 22, 23:
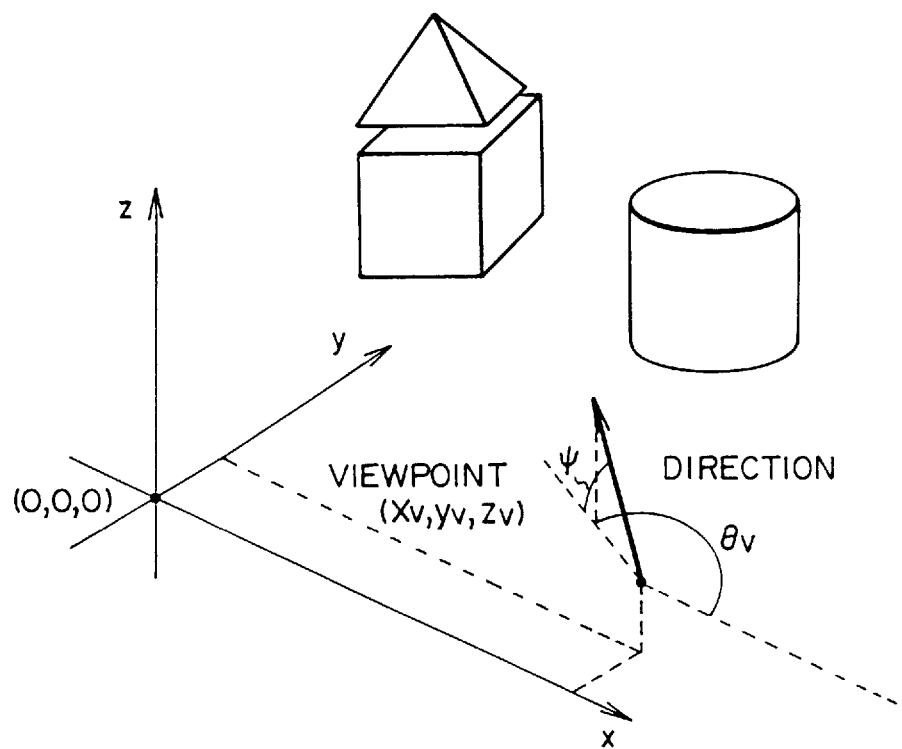
FIG. 22 is a view showing thee-dimensional arrangement modeled after plant equipments and parts to be measured, and position and direction of viewpoint.
FIG. 23 is a view showing an example of distribution measurement image data consisting of measured values.

Further, explanation will be given in more practical sense in connection with the case where distribution measurement of vibration strengths of three three-dimensional bodies as shown in FIG. 22 is conducted by a scanning laser vibration meter with respect to the above-mentioned first processing example. It is to be noted that three three-dimensional bodies are assumed to be respectively plant equipments or parts.

In FIG. 22, it is assumed that shape models of these plant equipments or parts are prepared by plant equipment spatial shape model of the oordinate system indicated by the x-axis, the y-axis and the z-axis. It is further assumed that distribution measurement of vibrations of the surfaces of equipments or parts represented by three three-dimensional bodies by a scanning type laser vibration meter as described above at angle $\theta_v$ with respect to the x-axis on the xy plane and angle $\Phi_v$ with respect to the xy plane from the viewpoint ($x_v$, $y_v$, $z_v$).

For the brevity of explanation, it is assumed that distribution measurement image data of vibration strength of 6×6 as shown in FIG. 23 is obtained slightly from the right of the front surface and these image data look as shown in FIG. 24 in the case where they are displayed as image. In FIG. 23, numeric values within measures indicate vibration strength, which is given by the maximum value of absolute values of vibration speeds of the equipment surface. FIG. 24 indicates values of the measures of FIG. 5 by density of hatch.

In this example, an approach is employed to overlay (superpose) a projection chart of the plant equipment spatial shape model on (with respect to) the vibration distribution image data of FIGS. 23 and 24 to carry out grouping by regions subjected to projection of equipments or parts to allow ratio between between-class variance of measured values by that grouping, i.e., the vibration intensity in this case and total variance to be similarity to employ viewpoint and direction of the projection chart of the plant equipment spatial shape model which maximizes the similarity with the vibration distribution image as estimated values of the position and the direction of the measurement unit at the time of measurement of vibration distribution data.

Figure 25A:
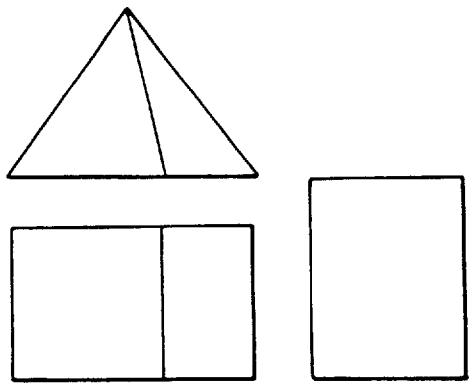
FIG. 25(a) a projection diagram of plant equipments or parts.
Figure 25B:
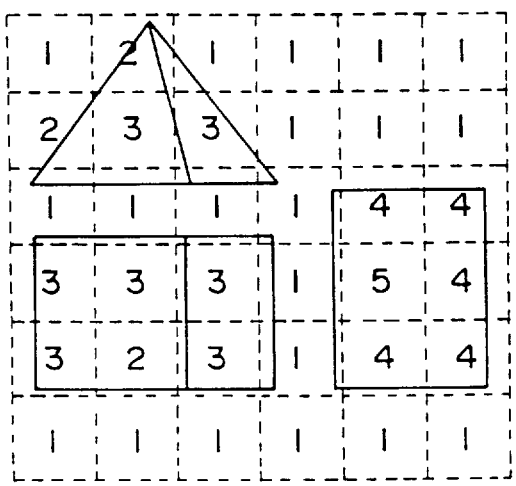
FIGS. 25(b) and 25(c) are views showing examples where projection diagram of plant equipments or parts is overlaid (superposed) on distribution measurement image data.
Figure 25C:
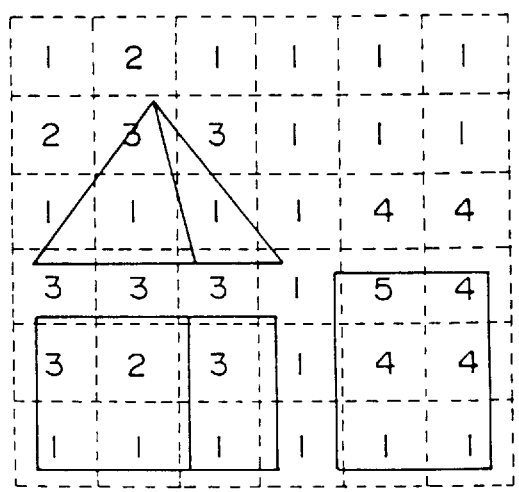

Let now consider the case where the projected image of the plant equipment spatial shape model shown in FIG. 25(a) is overlaid (superposed) on the distribution measurement image shown in FIG. 23 in a manner as indicated by FIG. 25(b) and 25(c).

Figure 26:
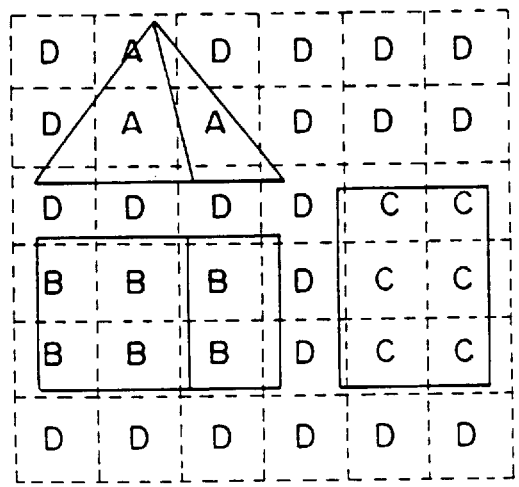
FIG. 26 is a view showing an example of grouping of measured values of distribution measurement image data by plant equipment or parts projection diagram.
Figure 27:
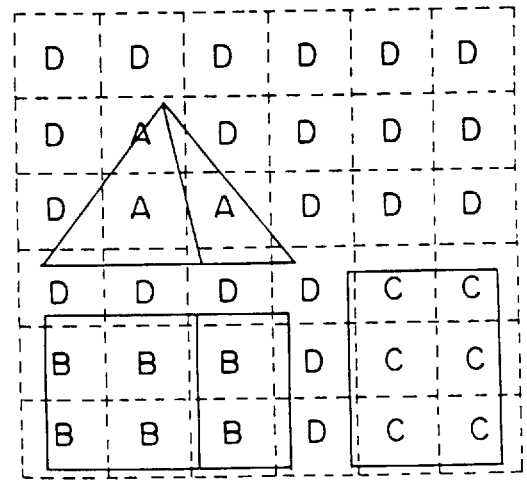
FIG. 27 is a view showing another example of grouping of measured values of distribution measurement image data by plant equipment or parts projection diagram.

Measured values are used as feature content of the distribution measurement image to carry out grouping by projection regions of respective parts of the projected image of the plant equipment spatial shape model. Grouping is assumed to be carried out by parts of projected image of the plant equipment spatial shape model overlaid at central portions between latices of respective distribution images. The grouping in the case where the area of the pyramid, the area of the parallelepiped, the area of the column and the background area are respectively assumed to be A, B, C and D, and a projected image of the spatial shape model is overlaid on the distribution image data as shown in FIG. 25(b) is shown in FIG. 26, and grouping in the case where such an overlaying operation is carried out as shown in FIG. 25(c) is shown in FIG. 27.

Total variance of distribution image data shown in FIGS. 23, 25(b) and 25(c) are defined by deviation square sum of measured values of all measures. When the i-th measured value of 36 measures is assumed to be Xi, average value $X_{AV}$ is derived from the formula (18) as follows.

$$X_{AV} = (1/36) \Sigma Xi = 2 \quad (22)$$

The total variance Va is derived from the formulas (19) and (22) as follows:

$$Va = \Sigma (Xi - 2)^2 = 56 \quad (23)$$

In the case of FIG. 25(b), since grouping is carried out as shown in FIG. 26, when the numbers of measured values of the group A, the group B, the group C and the group D are assumed to be respectively NA, NB, NC, ND, and average values are $(XA)_{AV}$, $(XB)_{AV}$, $(XC)_{AV}$, $(XD)_{AV}$ these average values are respectively $(XA)_{AV}=8/3$, $(XB)_{AV}=17/6$, $(XC)_{AV}=25/6$, $(XD)_{AV}=22/21$ from the formula (20). Thus, between-class variance Vc is derived from the formula (21):

$$\begin{aligned} Vc &= NA\,((NA)_{AV} - X_{AV})^2 + \\ & \quad NB\,((XB)_{AV} - X_{AV})^2 + \\ & \quad NC\,((XC)_{AV} - X_{AV})^2 + \\ & \quad ND\,((XD)_{AV} - X_{AV})^2 \\ &= 52.7\ldots \end{aligned} \quad (24)$$

Accordingly, ratio with respect to total variance of between-class variance in the case of FIG. 25(b) becomes equal to about 0.941.

Moreover, in a manner similar to the above, in the case of FIG. 25(c), grouping is carried out as shown in FIG. 27. Its between-class variance becomes equal to about 9.86 and ratio with respect to total variance of between-class variance becomes equal to about 0.176.

In the case where all measured values within the group are equal to average value of group, i.e., in the case where measured values are completely dependent upon the grouping, the between-class variance and the total variance are equal to each other, and its ratio becomes equal to 1. On the other hand, in the case where measured values are not completely dependent upon the grouping, average values of all groups are equal to each other, and the between-class variance becomes equal to zero. For this reason, ratio with respect to total variance of the between-class variance becomes equal to zero. Namely, the ratio with respect to total variance of between-class variance serves as index indicating to what extent grouping prescribes measured values, and serves as judgment index of position and direction of viewpoint in the case where it is used as similarity between two images. In the above-mentioned example, it is judged that position and direction of viewpoint of projected image in the case of FIG. 25(b) is closer to the actual position and direction of the measurement unit.

If a projection chart of a plant equipment spatial shape model corresponding to angle of visual field of the measurement equipment by viewpoint (position) ($x_v$, $y_v$, $z_v$) of the plant equipment spatial shape model, angle $\theta_v$ on the xy plane from the x-axis in the measurement direction, and angle $\theta_v$ from the xy plane is determined in this way, similarity defined by ratio between between-class variance and total variance by the above-mentioned method can be univocally determined.

While similarity is defined as a function of viewpoint (position), direction, i.e., $x_v$, $y_v$, $z_v$, $\theta_v$, $\phi_v$, it cannot be represented by explicit function. As a method of maximizing value of the function, various algorithms are known. For example, the simplex method which can determine maximum value even in the case where function is not analytically described is used to allow $x_v$, $y_v$, $z_v$, $\theta_v$, $\phi_v$ to be variables (parameters) of the function to determine $x_v$, $y_v$, $z_v$, $\theta_v$, $\phi_v$ which maximize the value of similarity to allow those values to be position and direction of the viewpoint of the obserbed distribution measurement image data.

Thus, correspondence between equipments or parts of the plant equipment spatial shape model and regions in the distribution measurement image data is determined by the position and the direction of the viewpoint of the determined distribution measurement image data, that is, measured values of respective equipments or parts, i.e., vibration strengths in this case are determined.

In the example shown in FIG. 25, since resolution of the distribution measurement image data is low value of 6×6, precise position and direction of the viewpoint of the measurement equipment cannot be calculated, but approximate calculation results can be determined. In this case, if distance at the position of a plant equipment to be monitored, which is projected into the dimensions of measures of 6×6 of the distribution measurement image is allowed to be maximum error and an error within the range of this resolution is tolerable, reasonable result can be obtained.

Figures 28, 29:
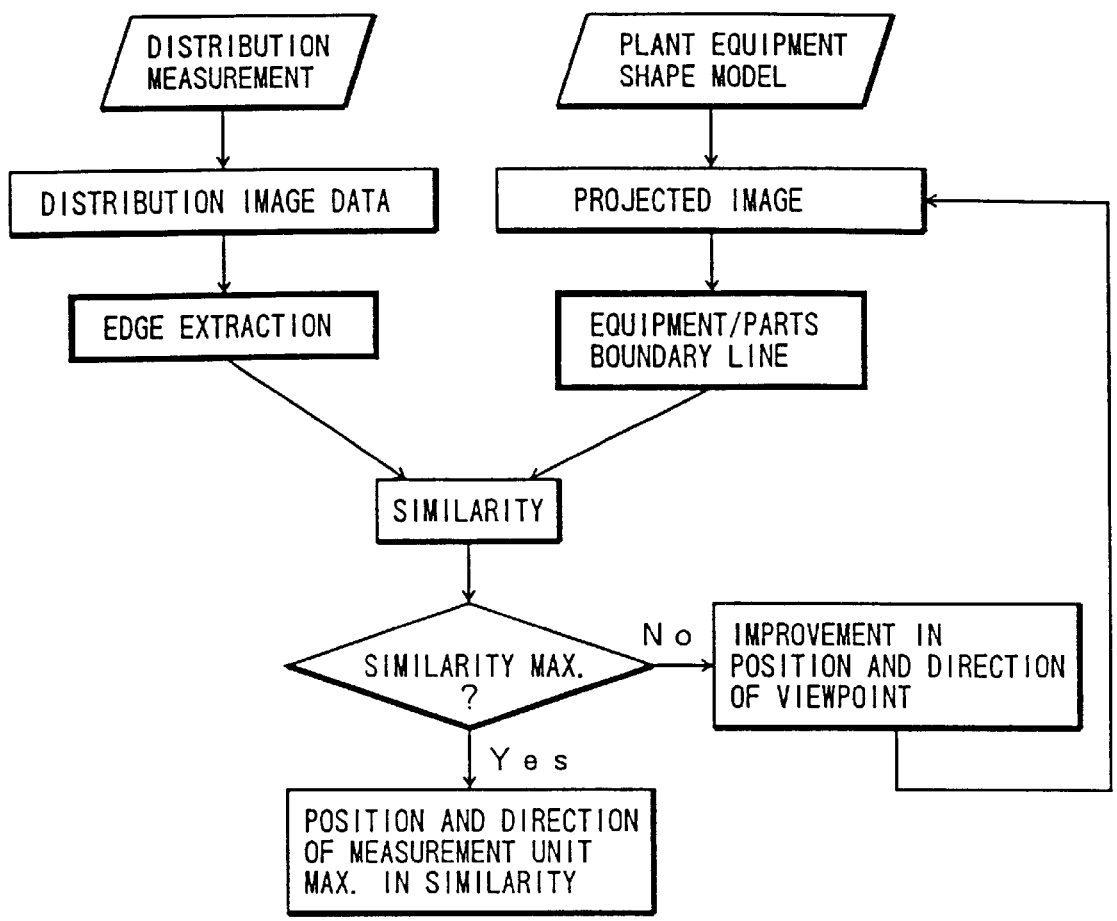
FIG. 28 is a flowchart showing a further example of the operation of the distribution measurement image data positioning means 2 of the equipment monitoring apparatus shown in FIG. 19.
FIG. 29 is a view showing an example of the result of edge extraction of distribution measurement image data.

FIG. 28 shows a second processing example of the operation shown in FIG. 20. As feature content of the distribution measurement image data, result obtained by carrying out edge extraction of image is used. As feature content of projected image of the plant equipment spatial shape model, value obtained by calculating an image displayed when boundary line, i.e., wire frame of equipment or parts surface of the spatial shape model data is projected onto the plane.

The edge extraction of image in the second processing example may be carried out by using, e.g., Sobel operator.

FIG. 29 shows the result obtained by carrying out edge extraction of the distribution measurement image data shown in FIG. 23 by Sobel operator. Sobel operator is an operator for extracting edge of image irrespective of direction. With respect to pixels in the area of 3×3 around respective pixels, absolute value of sum total of value obtained by multiplying pixel value of column immediately before by (−1, −2, −1) and pixel value obtained by multiplying pixel value of column immediately after by (1, 2, 1) is obtained as result by X-kernel. In addition, absolute value of sum total of values obtained by multiplying pixel values of row immediately before by (−1, −2, −1) and values obtained by multiplying pixel values by (1, 2, 1) are obtained as result by Y-kernel. Value obtained by two results is replaced into pixel value, thus to emphasize edge of image.

Figure 30:
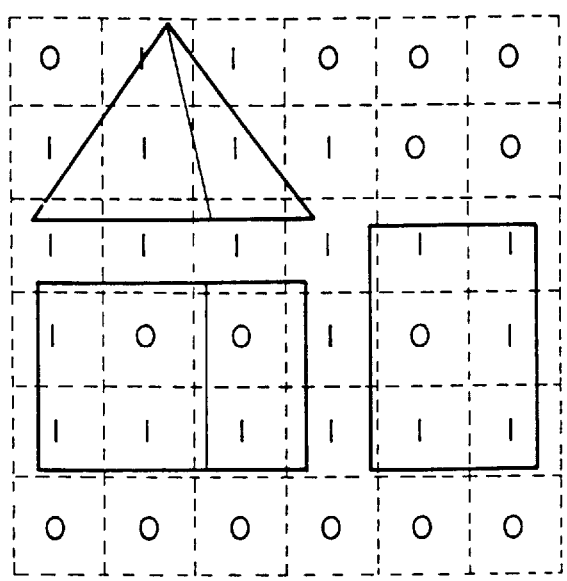
FIG. 30 is a view showing an example of boundary of projection area of plant equipments or parts.

FIG. 30 shows the case where plant equipment spatial shape model data is projected to allow a measure within which outline (contour) of equipment or part is included to be 1, and to allow a measure within which such outline is not included to be 0 (zero). When moment correlation of FIGS. 29 and 30 is calculated, its value becomes equal to about −0.076. It is possible to determine position and direction of the viewpoint of the plant equipment spatial shape model which maximizes this value in a manner similar to the previously described case of similarity defined by the ratio between between-class variance and total variance. In this example, the distribution measurement image data is simplified for the brevity. Accordingly, since resolution is very low, even if result obtained by edge extraction is used as feature content, it is impossible to satisfactorily determine position and direction of the viewpoint. However, satisfactory result can be obtained by allowing the resolution to be high.

FIG. 31 shows a modified example of the operation of the positioning means 2 shown in FIG. 20. This modification differs from the example of FIG. 20 in that feature content of the distribution measurement image data and feature content calculated from the spatial shape model data of the plant equipment are respectively projected in horizontal and vertical directions of pixels to provide one-dimensional image distributions to calculate respective similarities of one-dimensional distributions in horizontal and vertical directions of both images to determine such position and direction of the viewpoint to maximize both similarities in the horizontal vertical directions.

Figure 32:
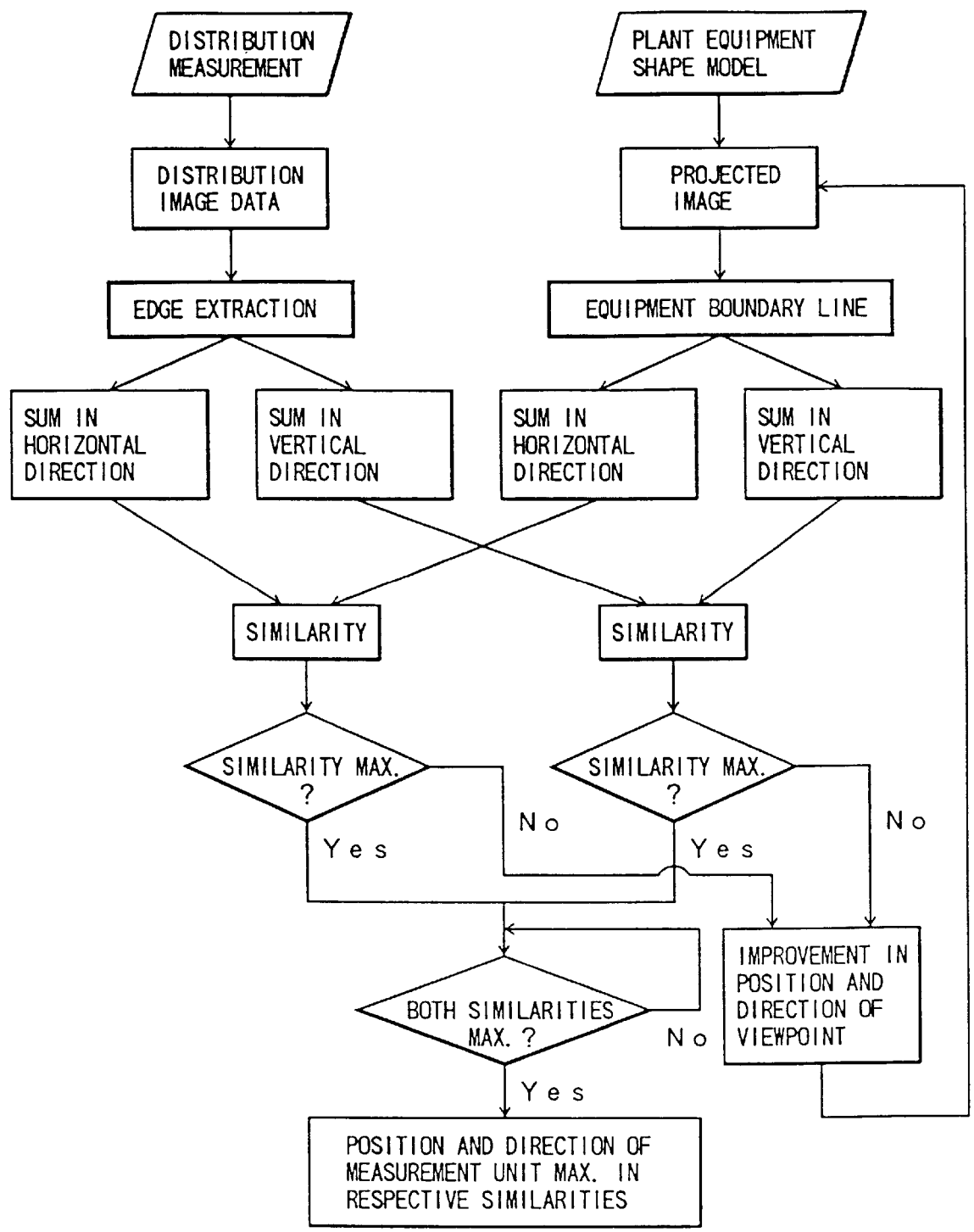
FIG. 32 is a flowchart showing a further example of the operation of the distribution measurement image data positioning means 2 of the equipment monitoring apparatus shown in FIG. 19.

FIG. 32 shows one processing example of the operation of the positioning means 2 shown in FIG. 31. As feature content of the distribution measurement image data, edge extraction result of image is used. As feature content calculated from image obtained by projecting spatial shape model of the plant equipment onto the plane, image displayed when boundary line, i.e., wire frame of equipment or parts surface of the spatial shape model data is used. Then, similarity between feature contents obtained when projected into horizontal and vertical directions is calculated by sum of feature content values of pixels to determine such position and direction of the viewpoint which maximize both similarities in the horizontal and vertical directions.

In such a method, positioning operations are carried out independently in the horizontal and vertical directions of the two-dimensional distribution measurement image to reduce the number of similarity calculations to advantageously shorten calculation time.

FIG. 33 shows another example of the operation of the positioning means 2. In this example, an approach is employed to select plural equipments or parts with respect to feature contents of distribution measurement image data to determine area of distribution measurement image data where similarity with feature contents of projection charts of equipments or parts from spatial shape model data of plant equipment to allow centers of gravity of respective equipments or parts and centers of gravity of areas of distribution measurement image data where similarity becomes maximum to be corresponding points to determine, as position and direction of the measurement unit, position and direction of viewpoint of a projection chart of the spatial shape model data of the plant equipment which minimize square sum of distances between the corresponding points on the projection chart of the spatial shape model data of the plant equipment and the distribution measurement image data.

In accordance with this method, it is possible to determine, by similarities based on respective feature contents, areas within distribution measurement image data corresponding to selected equipments or parts. Moreover, centers of gravity of corresponding areas are caused to be corresponding points to determine a projected image which minimizes square sum of distances between these corresponding points to reduce calculation quantity, thus to advantageously shorten calculation time.

FIG. 34 shows a first processing example of the operation shown in FIG. 33. As feature content of distribution measurement image data, result obtained by carrying out edge extraction of image and projection chart of the boundary of the surface of equipments or parts of spatial shape model data of plant equipments are used to determine partial area within a distribution picture where similarities are respectively maximum with respect to respective plant equipments or parts to allow respective centers of gravity to be corresponding points to determine, as position and direction of the measurement machine, position and direction of viewpoint of a projection chart of the plant equipment spatial shape model which minimizes square sum of distances between corresponding points on the projection chart of the plant equipment spatial shape model and the distribution measurement image data.

Figure 35:
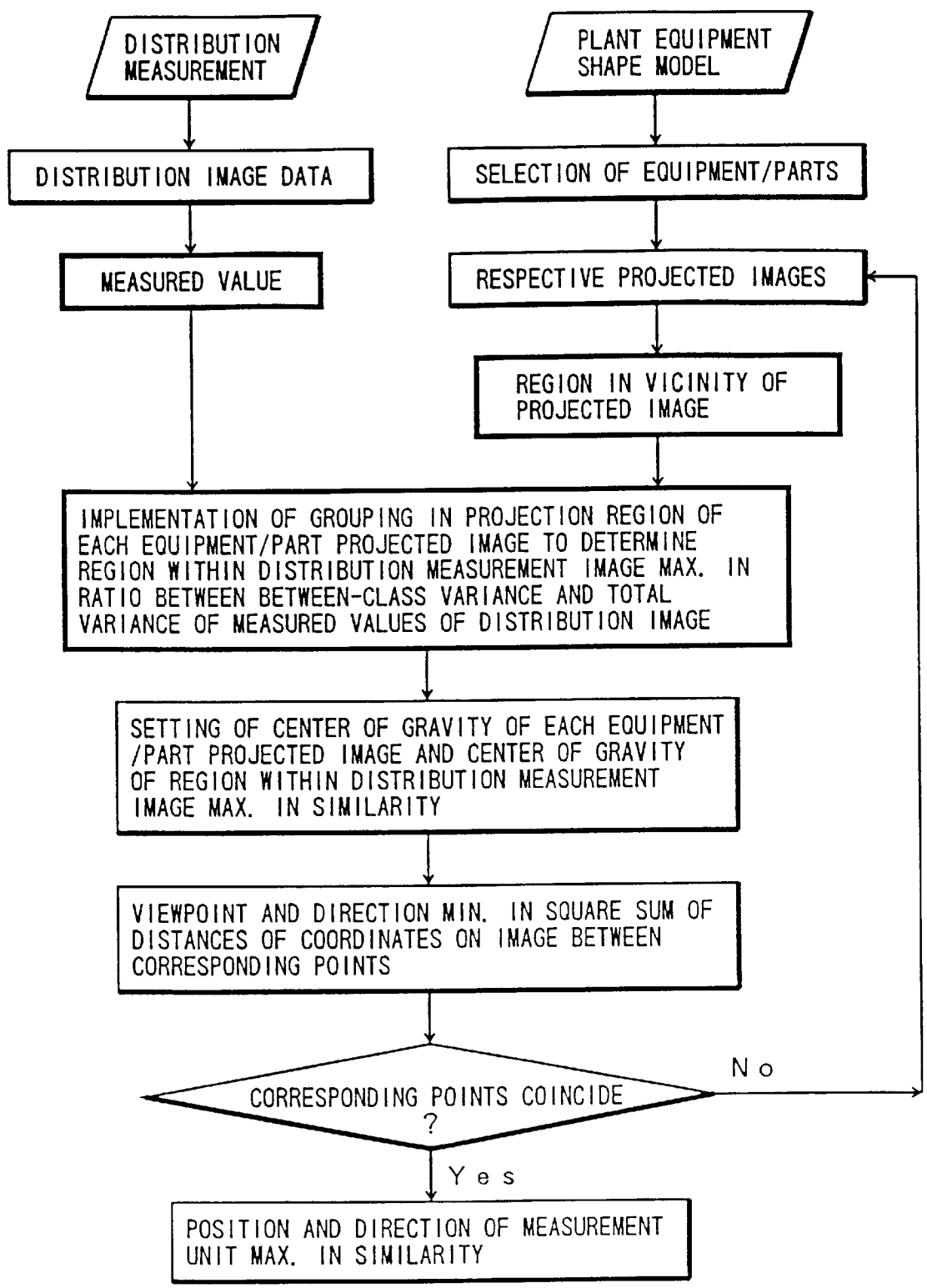
FIG. 35 is a flowchart showing a further example of the operation of the distribution measurement image data positioning means 2 of the equipment monitoring apparatus shown in FIG. 19.

FIG. 35 shows a second processing example of the operation shown in FIG. 33. An approach is employed such that measured values are used as feature content of distribution measurement image data to overlay (superpose), on the distribution measurement image, the area in the vicinity of an image obtained by projecting equipments or parts selected from the spatial shape model of the plant equipment onto the plane to classify measured values of distribution measurement image data into a first group where they are included within the area of equipments or parts and a second group where they are not included therewithin to allow ratio between between-class variance by grouping and total variance to be similarity to determine the area of distribution measurement image data where the similarity becomes maximum as portions corresponding to the selected equipments or parts to allow respective centers of gravity to be corresponding points to determine, as position and direction of the measurement unit, position and direction of viewpoint of such a projected image to minimize square sum of distances between these corresponding points.

This processing method will now be described by using the same data as distribution measurement data of vibration strength of the previously plant equipment.

Figure 36:
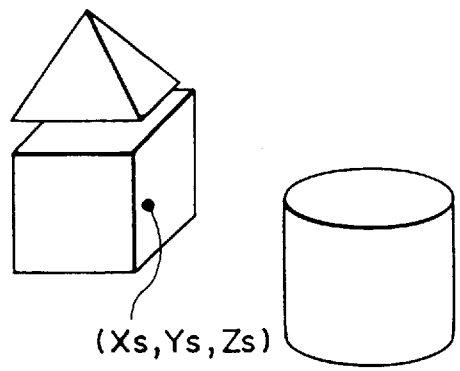
FIG. 36 is a view showing a spatial position on plant equipments or parts, to which the center of gravity of the projection diagram corresponds.
Figure 37:
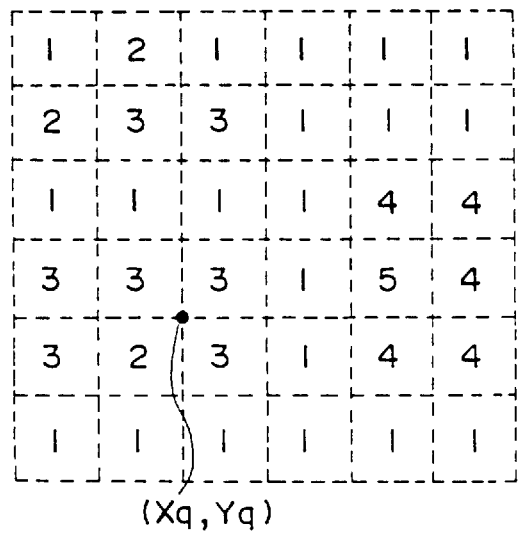
FIG. 37 is a view showing the center of gravity of the region where similarity is maximum in a distribution measurement image.

In distribution measurement image data of vibration strength of 6×6 shown in FIG. 37 obtained with respect to the plant equipment shown in FIG. 36, coordinates (X, Y) to increment, by one, X from the left to the right and Y from upper direction to lower direction with respect to measures between lattices are defined.

Figure 38:
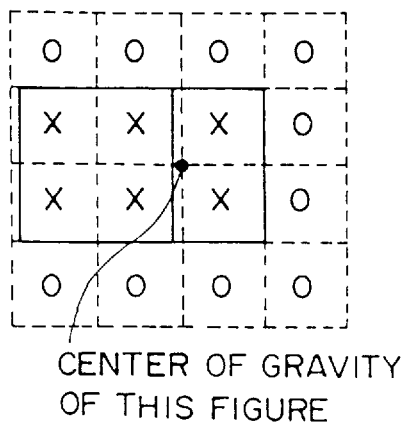
FIG. 38 is a view showing grouping of regions by a single plant equipment or part projection diagram.

Let now consider the case where the projection chart of part of parallelpiped and portions in the vicinity thereof of the plant equipments shown in FIG. 36 is caused to correspond to the area of the distribution measurement image. A procedure is taken to allow the left upper end of a projection chart of part of parallelpiped of 4×4 and the portion in the vicinity thereof shown in FIG. 38 and position of coordinates (X, Y) of the distribution measurement image shown in FIG. 37 to be overlaid (superposed) each other to classify the distribution measured values into a first group where they are included within the parts area and a second group where they are not included therewithin as shown in FIG. 38 to determine ratio between between-class variance and total variance of measured values of the distribution measurement image data with respect to these two groups. The overlaid portion is 16 measures of 4×4 shown in FIG. 38. The distribution measured values overlaid by 6 measures marked X and 10 measured marked 0 of these 16 measures are classified into two groups, thus making it possible to calculate total variance and between-class variance similarly to the previously described method. With respect to coordinates (X, Y) on the distribution measurement image shown in FIG. 37 on which the left upper end of the projection chart of 4×4 shown in FIG. 38 is overlaid, ratio between between-class variance and total variance is expressed as follows.

```
(X, Y); Between-class variance/Total variance
(0, 0); 0.00513
(0, 1); 0.00000
(0, 2); 0.93798
(1, 0); 0.04103
(1, 1); 0.14594
(1, 2); 0.00360
(2, 0); 0.01531
(2, 1); 0.00110
(2, 2); 0.04186
```

In this example, the above-mentioned coordinates (X, Y) are such that, in FIG. 37, coordinates at the right upper end are caused to be (0, 0), and coordinates at the right lower end are caused to be (6, 6).

As described above, when the left upper end of the projection chart of FIG. 38 is overlaid on coordinates (0, 2) of the distribution measurement image, ratio of between-class variance with respect to total variance as similarity is maximum. Namely, center of gravity of the projection chart of FIG. 38 and center of gravity of the corresponding area of the distribution measurement image serve as points corresponding to each other.

It is now assumed that coordinates in the plant equipment spatial shape model data at the equipment surface of the center of gravity of FIG. 38 is $(x_s, y_s, z_s)$ and two-dimensional coordinates on the projection chart thereof are $(X_p, Y_p)$. Thus, center of gravity $(X_q, Y_q)$ of the area corresponding to the distribution measurement image is determined. In the case of this example, the center of gravity is (2, 4). Coordinates $(X_q, Y_q)$ are shown in FIG. 37, and coordinates $(x_s, y_s, z_s)$ are shown in FIG. 38.

In a manner as described above, with respect not only to the parallelpiped parts but also to the pyramid parts and columnar parts, projection chart gravity center and center of gravity of the corresponding area within the distribution measurement image are determined. If an approach is employed to fix two of five parameters of three spatical coordinates $(x_v, y_v, z_v)$ indicating position of such viewpoint to minimize distances between $(X_p, Y_p)$ and $(X_q, Y_q)$ and angle $\theta_v$ in a horizontal direction and angle $\phi_v$ in a vertical direction for prescribing the direction respectively as corresponding points, three parameters can be determined.

While only three parts appear in this example, if five parts or more can be selected, it is possible to determine all of five parameters.

In a manner as stated above, with respect to parameters $(x_v, y_v, z_v, \theta_v, \phi_v)$ of position and direction of the viewpoint, n sets of points $(X_{pi}, Y_{pi})$ on the projection chart obtained by projection onto the plane of corresponding points $(x_{si}, y_{si}, z_{si})$ of the i (i=1, 2, ..., n)-th part and corresponding points $(X_{qi}, Y_{qi})$ on the distribution measurement image are determined. In this case, square sum R relating to i of distance between $(X_{pi}, Y_{pi})$ and $(X_{qi}, Y_{qi})$ is expressed as follows:

$$R=\Sigma\{(X_{pi}-X_{qi})^2+(Y_{pi}-Y_{qi})^2\}$$

Parameters $(x_v, y_v, z_v, \theta_v, \phi_v)$ are determined so as to minimize the above-mentioned square sum R. The $(X_{pi}, Y_{pi})$ can be represented as a function by projection of $(x_v, y_v, z_v, \theta_v, \phi_v)$. If (Xqi, Yqi) are fixed, R can be represented by function of $(x_v, y_v, z_v, \theta_v, \phi_v)$. Accordingly, it is possible to determine $(x_v, y_v, z_v, \theta_v, \phi_v)$ which minimize the square sum R of distance by the method such as the simplex method, the steepest decent method or the Newton method.

The correspondence relationship by maximum of similarity between projection chart of plant equipments or parts and distribution measurement image data area slightly changes in dependency upon position and direction of the viewpoint $(x_v, y_v, z_v, \theta_v, \phi_v)$. For this reason, even if parameters $(x_v, y_v, z_v, \theta_v, \phi_v)$ of the viewpoint which minimize the square sum R of distance are once determined, it is necessary to determine, for a second time, the correspondence relationship in which similarity between projection chart of plant equipments or parts by the determined viewpoint and distribution measurement image data area is maximum to repeat similar procedure. If the square sum R of distance or parameters $(x_v, y_v, z_v, \theta_v, \phi_v)$ of the viewpoint can be converged by such a repetition, the position and the direction of the viewpoint thus converged are determined as position and direction of measurement equipment of distribution measurement image data.

FIG. 39 shows a modified example of the second processing example shown in FIG. 35. This modification differs from the second processing example in that results obtained by binarizing measured valuea into pixels which is within a range of a predetermined value and pixels which is not within such a range are used as feature content of distribution measurement image data to allow a value in which sum or square sum of distances between center of gravity coordinates closest to each other in the case where both images are overlaid each other to be corresponding points from coordinates of the center of gravity of the closed area of the binarized image and coordinates of respective centers of gravity of images obtained when selected plant equipment or part of spatial shape model data of plant equipment is projected.

An example of calculation in this case will now be described by using the same distribution measurement image data of plant equipment as previously described data.

Figure 40:
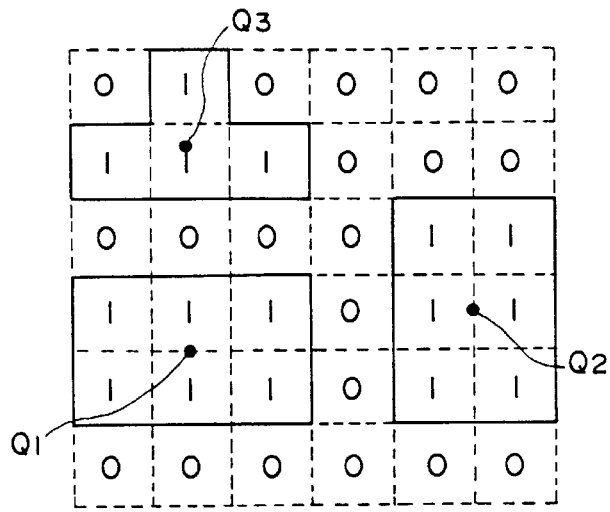
FIG. 40 is a view showing binarized distribution measurement image data, respective regions obtained by binarization, centers of gravity of respective regions.
Figure 41:
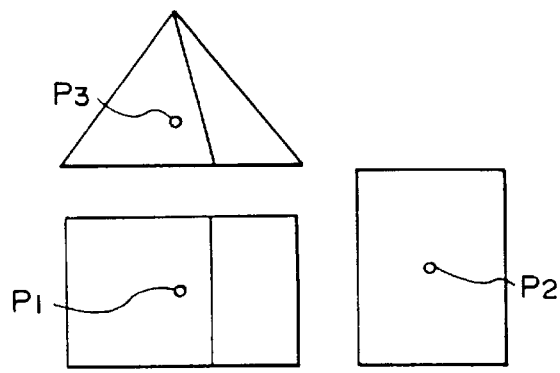
FIG. 41 is a view showing a projection chart of a plant equipment spatial shape model and centers of gravity of respective equipments or parts projected images.
Figure 42:
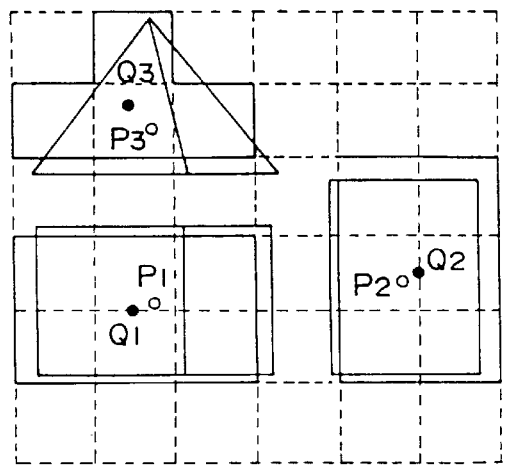

A measured value of the distribution measurement image data shown in FIG. 23 is classified into values less than 1.5 and values equal to 1.5 or more to determine center of gravity of the closed area of a graphic obtained by binarization. FIG. 40 shows the result in the case where binarization is made such that values less than 1.5 are 0 and values of 1.5 or more are caused to be 1 to determine center of gravity of the closed area. FIG. 41 shows an example of projection chart of the plant equipment spatial shape model and centers of gravity of respective equipments or parts in this projection chart. The state where the projection chart of FIG. 41 is overlaid on the binarized distribution measurement image of FIG. 40 is shown in FIG. 42. When centers of gravity of the both drawings where distance therebetween is the closest are selected, Q1 and P1, Q2 and P2, and Q3 and P3 are obtained. These values are caused to be respectively corresponding points to determine measurement unit position or direction of the measurement unit of the distribution measurement image data similarly to the procedure which has been described in the second processing example shown in FIG. 35.

FIG. 43 shows a further modified example of the second processing example shown in FIG. 35. An approach is employed to carry out a binarization such that measured values are caused to be pixels within a range of a predetermined value and pixels which is not within that range as feature content of the distribution measurement image data to allow ratio between periphery and area of the closed region to be feature content to determine ratio between periphery and area of projection chart of selected plant equipment or part of the spatial shape model of plant equipment to allow images of which ratios between periphery and area is minimum with respect to the closed area of distribution measurement image data and image of projection chart of selected equipment or part of spatial shape model of the plant equipment to correspond to each other to allow respective centers of gravity to be corresponding points to determine position or direction of the measurement unit of the distribution measurement image data similarly to the above at times subsequent thereto.

Figure 44:
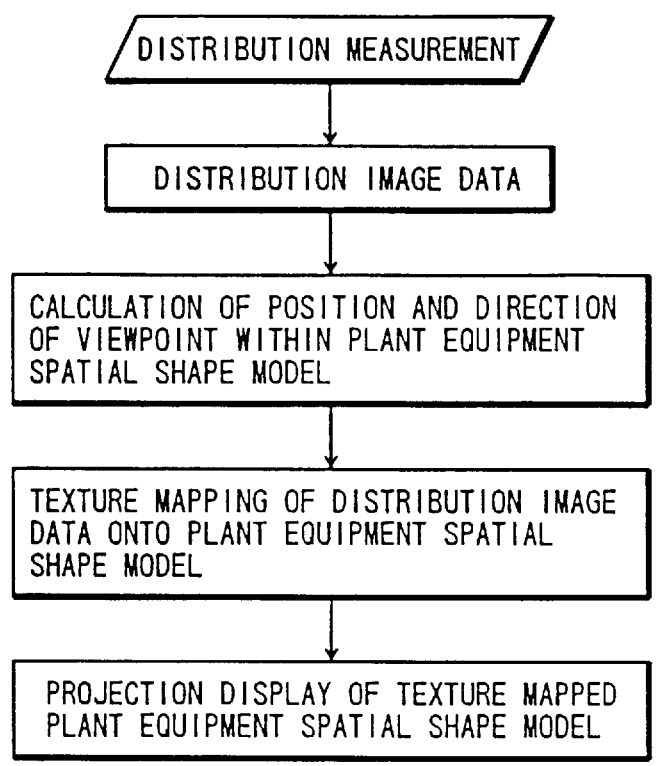
FIG. 44 is a flowchart showing an example of the operation of the equipment monitoring apparatus shown in FIG. 19.

FIG. 44 shows the operation of the equipment monitoring apparatus shown in FIG. 19. As shown in FIG. 44, distribution measurement of state quantity such as temperature, vibration or sound of the plant equipment surface to be monitored is carried out by the distribution measurement unit 1. When distribution measurement image data is prepared, position and direction of viewpoint where the plant equipment spatial shape model to be measured is projected are calculated in accordance with the previously described procedure by the distribution measurement image data positioning means 2. Then, the distribution measurement image data from the distribution measurement unit 1 is subjected to texture-mapping onto the equipment surface of the plant equipment spatial shape model by using the position and the direction of the viewpoint determined at the distribution measurement image data positioning means 2 by the texture-mapping means 3. Then, the texture-mapped plant equipment spatial shape model data is projected onto the two-dimensional plane by the projecting means 4. Thereafter, the projection chart thus obtained is displayed on the image display unit 5.

FIG. 45 shows an example of a more practical equipment configuration of the equipment monitoring apparatus shown in FIG. 19. In this example, a scanning type laser vibration meter 11 is used as the distribution measurement unit 1, and a CRT display unit 12 is used as the image display unit 5. Further, distribution measurement image data positioning means 2, texture-mapping means 3 and projecting means 4 are realized by a computer 13. Distribution measurement image data positioning program 14, texture-mapping program 15 and three-dimensional CAD (3D-CAD) display program 16 are respectively correspondingly set to those means.

In this example, as the plant equipment spatial shape model, plant three-dimensional CAD data prepared for designing spatial arrangement of equipment at the time of plant designing is utilized. The plant three-dimensional CAD is used as means for confirming three-dimensional arrangement of the plant at the time of plant designing.

The prepared data can be utilized as the shape models of respective plant equipments.

Figure 46:
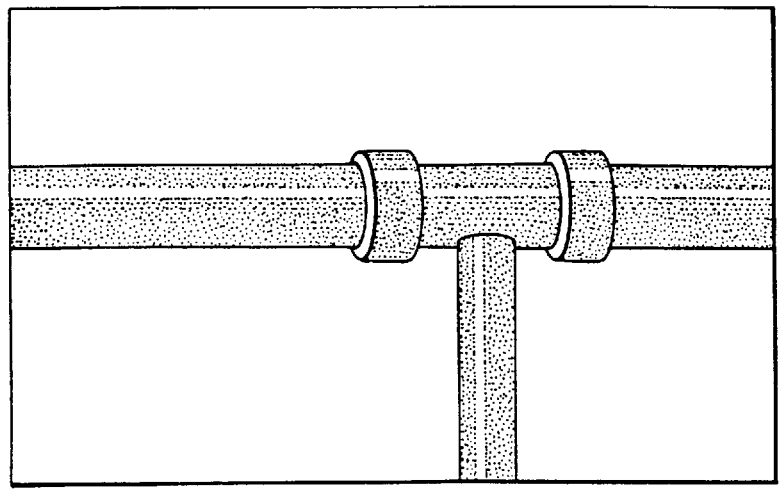
FIG. 46 is a view showing an example of a projection chart display at texture at the primary equipment surface of three-dimensional CAD data.
Figure 47:
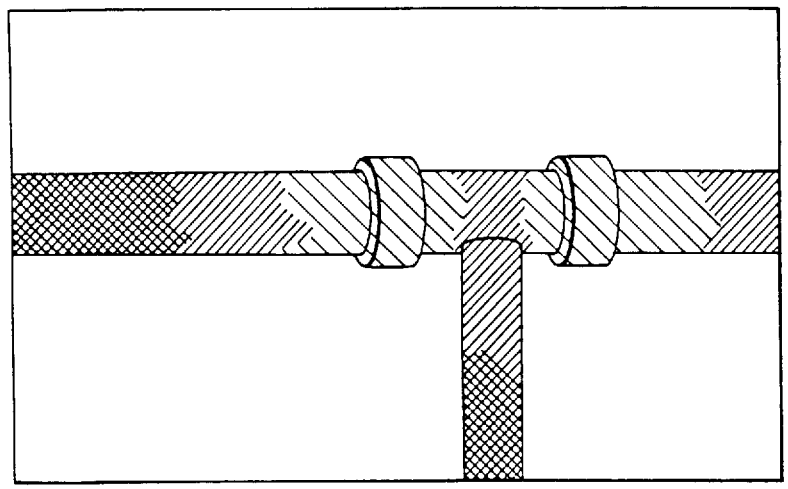
FIG. 47 is a view showing an example of a projection chart display in the state where distribution measurement image data is texture-mapped onto three-dimensional CAD data.

The distribution measurement image data positioning program 14 serves to calculate measurement position/direction with respect to distribution measurement image of measured vibration strength. The texture mapping program 15 serves to project distribution measurement image onto the corresponding equipment surface by positioning to store it as texture of the equipment surface. The three-dimensional CAD display program 16 serves to describe a chart (drawing) in which plant equipment spatial shape at a viewpoint designated by user is projected onto the plane irrespective of the position and the direction of the measurement equipment. In writing such a drawing, the stored distribution measurement image is used as texture without use of texture of the equipment surface primarily stored as the three-dimensional CAD data to under-describe the surface of the plant equipment. The example where light source is assumed by texture of the equipment surface primarily stored as the three-dimensional CAD data to describe a drawing is shown in FIG. 46. An example of the case where distribution measurement image is subjected to texture-mapping to display a projection chart by that texture is shown in FIG. 47. In FIG. 47, half-tone dot meshing is caused to be three levels. It is assumed that according as the half-tone dot meshing density becomes higher, more strong vibration has been measured. No texture-mapping with respect to the background. In this case, no picture is displayed.

In the equipment monitoring apparatus thus constituted, when distribution measurement image data of vibration strength from the scanning type laser vibration meter 11 is inputted to the computer 13, the computer 13 displays, on the CRT display unit 12, a projection chart of the spatial shape of the plant equipment in which distribution measurement image data of vibration strength as shown in FIG. 47 is subjected to texture-mapping by the distribution measurement image data alignment program 14, the texture-mapping program 15, and the three-dimensional display program 16.

As is clear from the foregoing description, in accordance with the above-mentioned embodiment, even in the case where position and direction of the measurement equipment are unknown, it is possible to allow distribution measurement image data to undergo texture-mapping onto the equipment surface of the plant equipment spatial shape model to display it on the display unit. Thus, operator can easily monitor distribution measurement image data in a manner caused to be in correspondence with equipments or parts. This is effective for early detection of extraordinary condition of equipment, etc.

In addition, it becomes easy to monitor measured result of the same portion by different distribution measurement unit in a manner caused to be in correspondence with measured result by the main distribution measurement unit. It becomes possible to expect further effect such as early detection of unusual condition of equipment, etc.

As described above, in accordance with this invention, positioning of distribution measurement image data in which position and direction of measurement equipment are unknown can be automatically carried out so that it is in correspondence with a projected image of plant equipment spatial shape model to be measured. Further, plant equipment spatial shape model in which distribution measurement image data is subjected to texture-mapping onto the equipment surface is displayed on the display unit, thereby making it possible to facilitate monitoring of equipment state by the distribution measurement image data.

What is claimed is:

1. A method for monitoring equipment behavioral characteristics by distribution measurement data, the method comprising the steps of:

taking in two-dimensional distribution measurement data relating to the behavioral characteristics of equipments including an equipment to be monitored;

allowing the two-dimensional distribution measurement data and a display result by a three-dimensional shape model of the equipment to be monitored to undergo positioning, and overlay-displaying them in a manner such that they are caused to correspond to each other;

designating an equipment portion to be inspected from the display content;

allowing the measurement data of the equipment to be monitored to undergo mapping onto the three-dimensional shape model corresponding to the designated equipment portion; and detecting changes in the measurement data thus to judge whether or not the equipment to be monitored is in an unusual condition.

2. A method for monitoring equipment behavioral characteristics by distribution measurement data as set forth in claim 1, wherein, in overlaying of the distribution measurement data and the three-dimensional shape model of the equipment to be monitored, such overlaying operation is carried out by allowing a distribution image in which viewpoint coordinates, a viewpoint direction and an angle of visual field in the distribution measurement are designated and the three-dimensional shape model of the equipment to be monitored to be in alignment with each other.

3. A method for monitoring equipment behavioral characteristics by distribution measurement data as set forth in claim 2, wherein, in overlaying of the distribution measurement data and the three-dimensional shape model of the equipment to be monitored, a two-dimensional visible image in which the relationship with a viewpoint position, a viewpoint direction and an angle of visual field in the distribution measurement is known is used as an auxiliary picture for alignment to allow the auxiliary picture and the three-dimensional shape model of the equipment to be monitored to undergo positioning so that they are in correspondence with each other.

4. A method for monitoring equipment behavioral characteristics by distribution measurement data as set forth in claim 1, wherein, in overlaying of the distribution measurement data and the three-dimensional shape model of the equipment to be monitored, points caused to be aligned of an image of the distribution measurement data and the three-dimensional shape model of the equipment to be monitored are designated on the image to calculate view point coordinates, a viewpoint direction and an angle of visual field to thereby allow the distribution image and the three-dimensional shape model of the equipment to be monitored to undergo positioning so that they are in correspondence with each other.

5. A method for monitoring equipment behavioral characteristics by distribution measurement data as set forth in claim 4, wherein, in overlaying of the distribution measurement data and the three-dimensional shape model of the equipment to be monitored, a two-dimensional visible image in which the relationship with a viewpoint position, a viewpoint direction and an angle of visual field in the distribution measurement is known is used as an auxiliary picture for alignment to allow the picture and the three-dimensional shape model of the equipment to be monitored to undergo positioning so that they are in correspondence with each other.

6. A method for monitoring equipment behavioral characteristics by distribution measurement data as set forth in claim 1, wherein, in overlaying of the distribution measurement data and the three-dimensional shape model of the equipment to be monitored, feature contents of the distribution measurement data are detected to determine, on the basis of the detected feature points, points caused to be aligned of an image of the distribution measurement data and the three-dimensional shape model of the equipment to be monitored to calculate viewpoint coordinates, a viewpoint direction and an angle of visual field to thereby allow the distribution image and the three-dimensional shape model of the equipment to be monitored to undergo positioning so that they are in correspondence with each other.

7. A method for monitoring equipment behavioral characteristics by distribution measurement data as set forth in claim 6, wherein, in overlaying of the distribution measurement data and the three-dimensional shape model of the equipment to be monitored, a two-dimensional visible image in which the relationship with a viewpoint position, a viewpoint direction and an angle of visual field in the distribution measurement is known is used as an auxiliary picture for alignment to allow the picture and the three-dimensional shape model of the equipment to be monitored to undergo positioning so that they are in correspondence with each other.

8. A method for monitoring equipment behavioral characteristics by distribution measurement data as set forth in claim 1, wherein an equipment to be inspected is designated by a piping instrumentation diagram displayed within a picture on screen to transfer a name of equipment corresponding thereto to the three-dimensional shape model to thereby designate the equipment to be inspected.

9. A method for monitoring equipment behavioral characteristics by distribution measurement data as set forth in claim 1, wherein an equipment to be inspected is designated by a three-dimensional CAD chart displayed within a picture on screen.

10. A method for monitoring equipment behavioral characteristics by distribution measurement data as set forth in claim 1, wherein an equipment to be inspected is designated from a pictorial image corresponding to the three-dimensional shape model displayed within a picture on screen.

11. A method for monitoring equipment behavioral characteristics by distribution measurement data as set forth in claim 1, wherein an equipment to be inspected is designated by distribution measurement data corresponding to the three-dimensional shape model displayed within a picture on screen.

12. A method for monitoring equipment behavioral characteristics by distribution measurement data as set forth in claim 1, wherein the two-dimensional distribution measurement data of equipments includes at least one of vibrations, surface temperatures and acoustic sounds of the equipments.

13. A method for monitoring equipment behavioral characteristics by distribution measurement data as set forth in claim 12, wherein the two-dimensional distribution measurement data of equipments corresponds to data related to non-visual characteristics of the equipments.

14. A method for monitoring equipment behavioral characteristics by distribution measurement data as set forth in claim 1, wherein an equipment to be inspected is designated by a two-dimensional pictorial image corresponding to the three-dimensional shape model displayed within a picture on screen.

15. A method for monitoring equipment behavioral characteristics by distribution measurement data as set forth in claim 1, wherein a three-dimensional shape is generated from a plurality of two-dimensional pictorial images as a three-dimensional shape model of an equipment onto which measurement data is subjected to mapping.

16. A method for monitoring equipment behavioral characteristics by distribution measurement data as set forth in claim 1, wherein a three-dimensional shape model of an equipment is generated from a plurality of two-dimensional pictorial images by the trigonometrical survey.

17. A method for monitoring equipment behavioral characteristics by distribution measurement data as set forth in claim 1, wherein when the distribution measurement data is caused to undergo mapping onto the three-dimensional shape model of the equipment to be monitored, correction by reflection factor of an object surface or relative inclination of the surface is made thereafter to carry out mapping of data.

18. A method for monitoring equipment behavioral characteristics by distribution measurement data as set forth in claim 1, wherein the distribution measurement data is caused to undergo mapping onto the three-dimensional shape model of the equipment to be measured thereafter to convert it into front view and side view to display them.

19. A method for monitoring equipment behavioral characteristics by distribution measurement data as set forth in claim 1, wherein the distribution measurement data is caused to undergo mapping onto the three-dimensional shape model of the equipment to be monitored thereafter to chart-display parameters of measurement data along the axial direction of the equipment to be monitored.

20. A method for monitoring equipment behavioral characteristics by distribution measurement data as set forth in claim 1, wherein when the distribution measurement data is caused to undergo mapping onto the three-dimensional shape model of the equipment to be monitored, measurement data of a plurality of pictures are subjected to mapping-synthesis into the three-dimensional shape model of the equipment to be monitored.

21. A method for monitoring equipment behavioral characteristics by distribution measurement data as set forth in claim 1, wherein distribution measurement data is compared with distribution measurement data measured last to judge the unusual condition based upon a difference therebetween.

22. A method for monitoring equipment behavioral characteristics by distribution measurement data as set forth in claim 1, wherein distribution measurement data is compared with an unusual condition judgment level set in advance to judge the unusual condition.

23. A method for monitoring equipment behavioral characteristics by distribution measurement data as set forth in claim 1, wherein the unusual condition is judged by change rate of the distribution measurement data.

24. A method for monitoring equipment behavioral characteristics by distribution measurement data as set forth in claim 1, wherein correlation with past data of distribution measurement data is calculated to judge the unusual condition.

25. A method for monitoring equipment behavioral characteristics by distribution measurement data as set forth in claim 1, wherein different two kind of measurement data or more are coupled to carry out judgment of the unusual condition by the coupled value.

26. A method for monitoring equipment behavioral characteristics by distribution measurement data, the method comprising the steps of:

inputting two-dimensional distribution measurement data relating to at least one of vibrations, surface temperatures and acoustic sounds of equipments including an equipment to be monitored;

computing in advance three-dimensional shape data of the equipment to be monitored based on at least one of measurement point coordinates, measurement direction and angle of visual field;

superimposing the three-dimensional shape data of the equipment to be monitored onto the two-dimensional distribution measurement data of the equipment to be monitored so that the three-dimensional shape data and the two-dimensional distribution measurement data of the equipment to be monitored are in correspondence with each other;

performing extraction mapping of the two-dimensional distribution measurement data of the equipment to be monitored that corresponds to a portion of the equipment to be monitored;

mapping the extracted two-dimensional distribution measurement data of the equipment to be monitored onto the three-dimensional CAD data of the equipment to be monitored; and judging whether or not the equipment to be monitored is currently in an unusual condition based on changes in the two-dimensional measurement data.

27. A method for monitoring equipment behavioral characteristics by distribution measurement data as set forth in claim 26, wherein the three-dimensional shape data of the equipment to be monitored is computed by a computer-aided design step.

28. A method for monitoring equipment behavioral characteristics by distribution measurement data as set forth in claim 27, wherein the two-dimensional distribution measurement data of equipments corresponds to data related to non-visual characteristics of the equipments.

* * * * *